(12) United States Patent
Khan et al.

(10) Patent No.: US 11,186,773 B2
(45) Date of Patent: Nov. 30, 2021

(54) LIQUID CRYSTAL COMPOSITIONS, MIXTURES, ELEMENTS, AND DIMMABLE DEVICES

(71) Applicant: NITTO DENKO CORPORATION, Osaka (JP)

(72) Inventors: Sazzadur Rahman Khan, San Diego, CA (US); Shijun Zheng, San Diego, CA (US)

(73) Assignee: Nitto Denko Corporation, Ibaraki (JP)

( * ) Notice: Subject to any disclaimer, the term of this patent is extended or adjusted under 35 U.S.C. 154(b) by 495 days.

(21) Appl. No.: 16/093,481

(22) PCT Filed: Apr. 13, 2017

(86) PCT No.: PCT/US2017/027501
§ 371 (c)(1),
(2) Date: Oct. 12, 2018

(87) PCT Pub. No.: WO2017/180923
PCT Pub. Date: Oct. 19, 2017

(65) Prior Publication Data
US 2021/0189240 A1    Jun. 24, 2021

Related U.S. Application Data

(60) Provisional application No. 62/467,689, filed on Mar. 6, 2017, provisional application No. 62/322,059, filed on Apr. 13, 2016.

(51) Int. Cl.
| | |
|---|---|
| *G02F 1/1333* | (2006.01) |
| *C09K 19/18* | (2006.01) |
| *C09K 19/12* | (2006.01) |
| *C09K 19/30* | (2006.01) |

(52) U.S. Cl.
CPC ............. *C09K 19/18* (2013.01); *C09K 19/12* (2013.01); *C09K 19/3003* (2013.01); *C09K 2019/122* (2013.01); *C09K 2019/123* (2013.01); *C09K 2019/181* (2013.01); *C09K 2019/3009* (2013.01); *C09K 2019/3016* (2013.01)

(58) Field of Classification Search
CPC .... C09K 19/18; C09K 19/12; C09K 19/3003; C09K 2019/122; C09K 2019/123; C09K 2019/181; C09K 2019/3009; C09K 2019/3016; G02F 1/1333
USPC .................................................. 252/299.66
See application file for complete search history.

(56) References Cited

U.S. PATENT DOCUMENTS

| | | |
|---|---|---|
| 3,947,375 A | 3/1976 | Gray et al. |
| 3,974,087 A | 8/1976 | Gray et al. |
| 4,971,719 A | 11/1990 | Vaz et al. |
| 5,958,290 A | 9/1999 | Coates et al. |
| 6,018,380 A | 1/2000 | Hu et al. |
| 6,020,941 A | 2/2000 | Ma |
| 6,124,005 A | 9/2000 | Kondo et al. |
| 6,285,434 B1 | 9/2001 | Ma et al. |
| 6,306,469 B1 | 10/2001 | Serbutoviez et al. |
| 6,376,030 B1 | 4/2002 | Heckmeier et al. |
| 6,383,577 B1 | 5/2002 | Chidichimo et al. |
| 6,623,810 B2 | 9/2003 | Sekine et al. |
| 7,439,000 B2 | 10/2008 | Bai et al. |
| 7,528,926 B2 | 5/2009 | Sung et al. |
| 8,405,799 B2 | 3/2013 | Fujisawa et al. |
| 8,420,235 B2 | 4/2013 | Zheng |
| 8,747,695 B2 | 6/2014 | Jasper et al. |
| 9,169,438 B2 | 10/2015 | Reiffenrath et al. |
| 2002/0001734 A1 | 1/2002 | Yoshikawa et al. |
| 2003/0003246 A1 | 1/2003 | Negoro et al. |
| 2004/0115367 A1 | 6/2004 | Iftime et al. |
| 2008/0063808 A1 | 3/2008 | Stumpe et al. |
| 2009/0290214 A1 | 11/2009 | Cho et al. |
| 2010/0149446 A1 | 6/2010 | Fujiwsawa et al. |
| 2010/0181533 A1 | 7/2010 | Jansen et al. |
| 2010/0201920 A1 | 8/2010 | Adlem et al. |
| 2012/0287354 A1 | 11/2012 | Heckmeier et al. |
| 2013/0128339 A1 | 5/2013 | Gu et al. |
| 2013/0207038 A1 | 8/2013 | Haensel et al. |
| 2013/0221274 A1 | 8/2013 | Reiffenrath et al. |
| 2013/0277611 A1 | 10/2013 | Jasper et al. |

(Continued)

FOREIGN PATENT DOCUMENTS

| | | | | |
|---|---|---|---|---|
| CN | 1434098 A | | 8/2003 | |
| CN | 102660296 | * | 9/2012 | ........... G02F 1/1333 |

(Continued)

OTHER PUBLICATIONS

Nolan, et al., Reverse mode polymer dispersed liquid crystal display incorporating a dual frequency addressable liquid crystal mixture, Molecular Crystals and Liquid Crystals Letters, 8(4), 75-83, Jan. 1991.

(Continued)

*Primary Examiner* — Geraldina Visconti
(74) *Attorney, Agent, or Firm* — Maschoff Brennan; Brent A. Johnson; David W. Old

(57) ABSTRACT

Described herein are liquid crystal compositions that can allow for the adjustment of their refractive indices by the application of an electric field. Also described herein are liquid crystal mixtures containing these compositions. In addition, selectively dimmable reverse-mode polymer dispersed liquid crystal (PDLC) elements and devices using these compositions are also described, which are transparent when no or low voltage is applied and opaque when a voltage or high voltage is applied.

9 Claims, 7 Drawing Sheets

(56) References Cited

U.S. PATENT DOCUMENTS

| | | | |
|---|---|---|---|
| 2014/0008575 | A1 | 1/2014 | Jasper et al. |
| 2014/0239227 | A1 | 8/2014 | Manabe et al. |
| 2014/0346399 | A1 | 11/2014 | Fujita et al. |
| 2015/0115204 | A1 | 4/2015 | Sekine et al. |
| 2015/0299577 | A1 | 10/2015 | Junge et al. |

FOREIGN PATENT DOCUMENTS

| | | | |
|---|---|---|---|
| CN | 104087307 | A | 4/2016 |
| EP | 0442266 | A1 | 8/1991 |
| EP | 1939268 | A1 | 7/2008 |
| JP | 07-292363 | A | 11/1995 |
| JP | 2006045416 | A | 2/2006 |
| WO | 2002093244 | A2 | 11/2002 |
| WO | 2010141754 | A1 | 12/2010 |
| WO | 2015022980 | A1 | 2/2015 |

OTHER PUBLICATIONS

Gotoh, et al., Preparation and Optical Properties of a Reverse-Mode Polymer Dispersed Liquid Crystal Film, MRS Proceedings, 277, 217-222, 1992.

Chen, T.-J. et al., Electro-optical properties of reverse-mode films of planar aligned polymer-dispersed liquid crystal. Journal of Polymer Research, 13(2), 85-89, Apr. 2006.

Perkowski, P. et al., Precise dielectric spectroscopy of a dual-frequency nematic mixture over a broad temperature range, Liquid Crystals, 39(10),1237-1242, Oct. 2012.

Xu, K. et al., One-pot synthesis of unsymmetrical diarylacetylenes via Sonogashira/deacetonation/Sonogashira cross-coupling of two different aryl chlorides with 2-methyl-3-butyn-2-ol, RSC Advances, 4(62), 32643-6, Jul. 2014.

Rudolph, S.E. et al., Technologies for Smart Windows, ASHRAE Journal, 51(7), 104-7, Jul. 2009.

Cupelli, D. et al., Reverse Mode Operation Polymer Dispersed Liquid Crystal with a Positive Dielectric Anisotropy Liquid Crystal, Journal of Polymer Science Part B: Polymer Physics, 49, 257-262, Dec. 2010.

Sbar, N.L. et al., Electrochromic dynamic windows for office buildings, International Journal of Sustainable Built Environment, 1, 125-139, 2012.

Macchione, M. et al., Photochromic Reverse mode polymer dispersed liquid crystals, Liquid Crystals, 32(3), 315-318, Mar. 2005.

Di Profio, G. et al., Reverse-Mode Operation Switchable Nematic Emulsions, Langmuir, 18(8), 3034-3038, Apr. 2002.

Yamaguchi, R. et al., Electro-optical Properties and Morphology of Reverse Scatterning Mode TN LCD, Journal of Photopolymer Science and Technology, 25(3), 313-316, Jun. 2012.

Yoon, H. et al., Homogeneous and homeotropic alignment of bent-core uniaxial and biaxial nematic liquid crystals, Soft Matter, 7(19), 8770-5, 2011.

Malthete, J. et al., Recherches sur les Substances Mésomorphes III. Tolanes Nématiques, Molecular Crystals and Liquid Crystals, 23(3-4), 233-60, Jan. 1973.

Hird, M., Fluorinated liquid crystals—properties and applications. Chemical Society Reviews, 36(12), 2070-95, 2007.

Mouquinho, A.I., et al, New Polymer Networks for PDLC Films Application. In New Polymers for Special Applications, 2012. InTech.

Jeong, S.Y., Liquid crystalline behavior of mesogens formed by anomalous hydrogen bonding (Doctoral dissertation, Kent State University), Aug. 2011.

Tanner, J.R., Novel alignment materials for use in liquid crystal displays (Doctoral dissertation, University of North Carolina at Chapel Hill), 2006.

Ahmad, F. et al., Current Trends in Studies on Reverse-Mode Polymer Dispersed Liquid-Crystal Films—A Review, Electronic Materials Letters, 10(4), 679-92, Jul. 2014.

Li, N. et al., Synthesis of 1, 4-Bis(phenylethynyl)benzenes and Their Application as Blue Phase Liquid Crystal Composition, International Journal of Molecular Sciences, 14(12), 23257-73, Nov. 2013.

Xu, K. et al., One-pot synthesis of unsymmetrical diarylacetylenes via Sonogashira/deacetonation/Sonogashira cross-coupling of two different aryl chlorides with 2-methyl-3-butyn-2-ol, Supporting Information, RSC Advances, 4(62), 32643-6, Jul. 2014.

Maji, M.S et al., Transition-Metal-Free Sonogashira-Type Coupling of ortho-Substituted Aryl and Alkynyl Grignard Reagents by Using 2,2,6,6-Tetramethylpiperidine-N-oxyl radical (TEMPO) as an Oxidant, Organic letters, 12(17), 3878-81, Aug. 2010.

Shunmughanathan, M. et al., Melamine-Based Microporous Network Polymer Supported Palladium Nanoparticles: A Stable and Efficient Catalyst for the Sonogashira Coupling Reaction in Water, ChemCatChem, 7(4), 666-73, Feb. 2015.

Abidin I.S.B.Z., Study on High-Performance PDLC Optical Devices (Master Thesis, Gunma University), 2013.

International Search Report and Written Opinion for PCT/US2017/027501, filed Jun. 30, 2017.

* cited by examiner

Positive Dielectric Anisotropy

Negative Dielectric Anisotropy

Positive Dielectric Anisotropy

Negative Dielectric Anisotropy

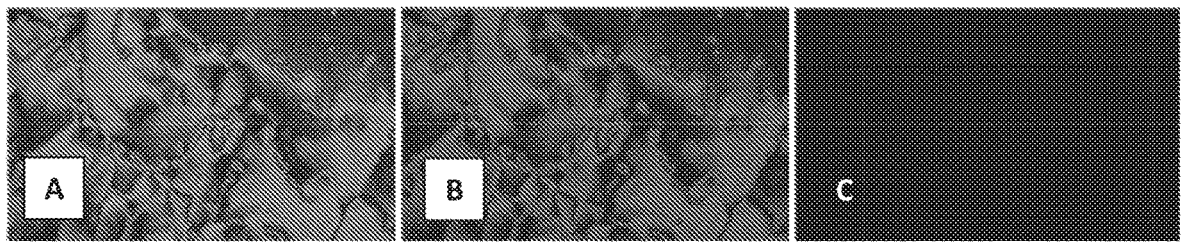
FIG. 6  Polarized Microscope Photos of PAC-1 Mixture
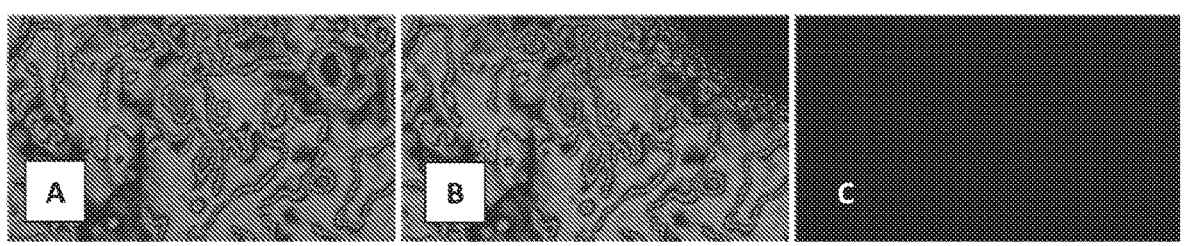
FIG. 7  Polarized Microscope Photos of PAC-4 Mixture
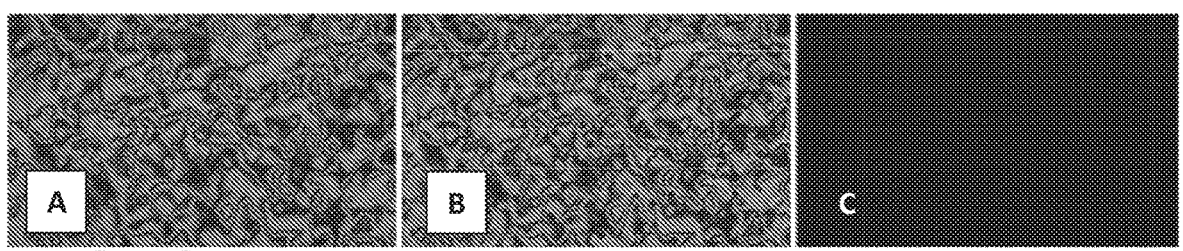
FIG. 8  Polarized Microscope Photos of PAC-5 Mixture
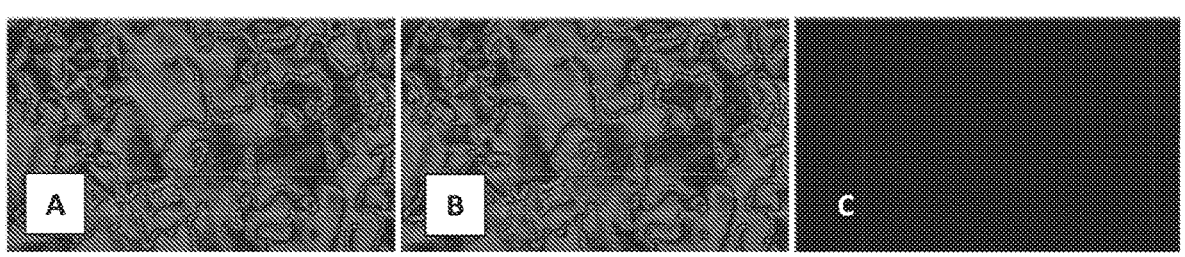
FIG. 9  Polarized Microscope Photos of CPAC-1 Mixture
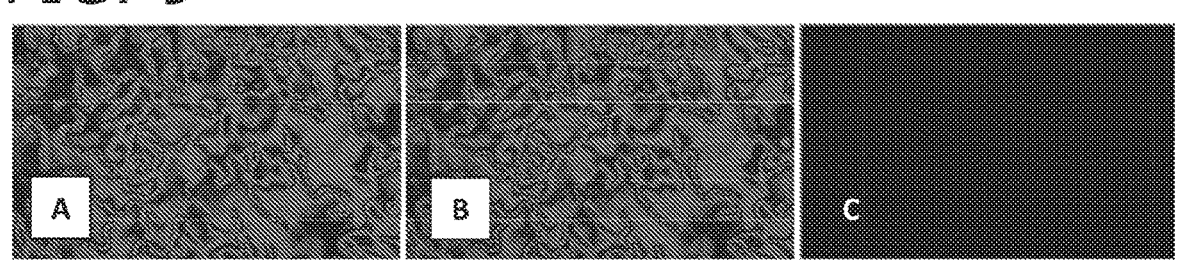
FIG. 10  Polarized Microscope Photos of MLC-2142 (Control)

LIQUID CRYSTAL COMPOSITIONS, MIXTURES, ELEMENTS, AND DIMMABLE DEVICES

CROSS REFERENCE TO RELATED APPLICATIONS

This application is a national phase application of PCT/US2017/027501 filed on Apr. 13, 2017, which claims priority to U.S. Provisional Application 62/322,059, filed on Apr. 13, 2016, and U.S. Provisional Application 62/467,689, filed on Mar. 6, 2017, the entire disclosures of which are incorporated by reference.

FIELD

This disclosure is related to compounds or compositions having both liquid and crystalline properties, and the elements or devices using these compounds or compositions.

BACKGROUND

In the field of windows, smart windows are attractive alternatives to conventional mechanical shutters, blinds, or hydraulic methods of shading. Currently, there are three main technologies for smart window applications: suspended particle displays (SPD), polymer dispersed liquid crystals (PDLCs), and metal oxide electrochromics (ECs).

One of the drawbacks of conventional PDLCs or conventional mode devices is that the window becomes transparent only when a voltage is applied, and it becomes opaque when the power is off. Opaque windows are not desirable in applications where visibility through the window would enhance safety, for example, when there is loss of power in an emergency situation such as in vehicle or aircraft crash or in a building fire. For electrochromic windows, the application of a voltage is usually needed to trigger a change in the window characteristics, even though it may not require maintaining dimming. In order to have transparent windows, advances have been made to create reverse mode devices such as Reverse Mode PDLCs, or PDLCs that are transparent when the power is off.

One way of creating reverse mode PDLCs is to use liquid crystal nematic compounds and aligning them in such a way that they are transparent in the off-state current (in other words, when the power is off).

To meet the market demands for low driving voltage, there is an increased need for new improved liquid crystal materials having high magnitudes of dielectric anisotropy to enable enhanced operation of reverse mode smart windows with low driving voltages.

SUMMARY

The current disclosure describes a new liquid crystal (LC) composition, a polymer dispersed liquid crystal (PDLC) element comprising the liquid crystal composition, a selectively dimmable device comprising the PDLC element, and methods of manufacturing the device. These new materials can be used in reverse mode PDLC dimmable devices. The materials can be integral to a window or applied as a coating to provide a dimming capability for privacy and other purposes.

Some embodiments can include a liquid crystal composition comprising a compound represented by Formula I:

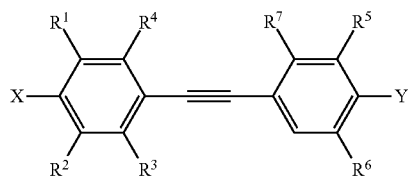

Formula I wherein Y is F, Cl, —CN, OH, $NO_2$, optionally substituted $C_{2-12}$ alkyl, optionally substituted $C_{1-12}$ alkoxy, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$; $R^1$, $R^2$, $R^3$, $R^4$, $R^5$, $R^6$ and $R^7$ are independently H, F, Cl, —CN, OH, $NO_2$, $C_{1-6}$ alkyl, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$; X is optionally substituted $C_{2-12}$ alkyl, optionally substituted $C_{1-12}$ alkyloxy, optionally substituted $C_{2-12}$ alkenyl, optionally substituted $C_{2-12}$ alkynyl; and $R^a$ and $R^b$ are independently H or optionally substituted $C_{1-6}$ hydrocarbyl.

Some embodiments can include a liquid crystal mixture comprising a liquid crystal composition of Formula I and one or more liquid crystal mixture compounds of Formula II:

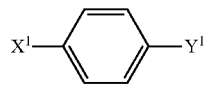

Formula II wherein $X^1$ is substituted phenyl, substituted cyclohexane, substituted biphenyl, or substituted cyclohexylbenzene; and $Y^1$ is $C_{1-6}$ alkyl, $C_{1-6}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$.

Some embodiments can include a liquid crystal element comprising a transparency changing layer and at least two alignment layers bounding each side of the transparency changing layer, wherein the transparency changing layer comprises a liquid crystal compound of Formula I.

Some embodiments can include a selectively dimmable device comprising an aforementioned liquid crystal element, at least two conductive substrates, and a voltage source. The first and second conductive substrates can define a gap between them, the liquid crystal element disposed between the first and second conductive substrates within the said gap. The substrates and the liquid crystal element can be in electrical communication with the voltage source such that when a voltage is applied from the voltage source, an electric field is generated across the liquid crystal element.

Some embodiments can include the characterization of the selectively dimmable devices. These devices can be characterized as having a haze of at most 25% when no voltage applied, and at least about 2% to visible light when a voltage of less than 15 volts is applied across the device. Some devices not only have high on-state haze, but also have desired very low haze at low very voltages of 0-5 volts, which may have various broad applications. Some embodiments include substrates that are flexible so that the device can form a flexible sheet providing versatility in industrial applications.

These and other embodiments are described in greater detail below.

BRIEF DESCRIPTION OF THE DRAWINGS

FIG. 6A is a picture of the polarized microscope images of a PAC-1 mixture at 40° C. showing the presence of a nematic phase.

FIG. 6B is a picture of the polarized microscope images of a PAC-1 mixture before the Isotropic Phase Transition showing a nematic phase.

FIG. 6C is a picture of the polarized microscope images of a PAC-1 mixture after the Isotropic Phase Transition showing an isotropic phase.

FIG. 7A is a picture of the polarized microscope images of a PAC-4 mixture at 40° C. showing the presence of a nematic phase.

FIG. 7B is a picture of the polarized microscope images of a PAC-4 mixture before the Isotropic Phase Transition showing a nematic phase.

FIG. 7C is a picture of the polarized microscope images of a PAC-4 mixture after the Isotropic Phase Transition showing an isotropic phase.

FIG. 8A is a picture of the polarized microscope images of a PAC-5 mixture at 40° C. showing the presence of a nematic phase.

FIG. 8B is a picture of the polarized microscope images of a PAC-5 mixture before the Isotropic Phase Transition showing a nematic phase.

FIG. 8C is a picture of the polarized microscope images of a PAC-5 mixture after the Isotropic Phase Transition showing an isotropic phase.

FIG. 9A is a picture of the polarized microscope images of a CPAC-1 mixture at 40° C. showing the presence of a nematic phase.

FIG. 9B is a picture of the polarized microscope images of a CPAC-1 mixture before the Isotropic Phase Transition showing a nematic phase.

FIG. 9C is a picture of the polarized microscope images of a CPAC-1 mixture after the Isotropic Phase Transition showing an isotropic phase.

FIG. 10A is a picture of the polarized microscope images of a MLC-2142 at 40° C. showing the presence of a nematic phase.

FIG. 10B is a picture of the polarized microscope images of a MLC-2142 before the Isotropic Phase Transition showing a nematic phase.

FIG. 10C is a picture of the polarized microscope images of a MLC-2142 after the Isotropic Phase Transition showing an isotropic phase.

DETAILED DESCRIPTION

1. General

Figure 1A:
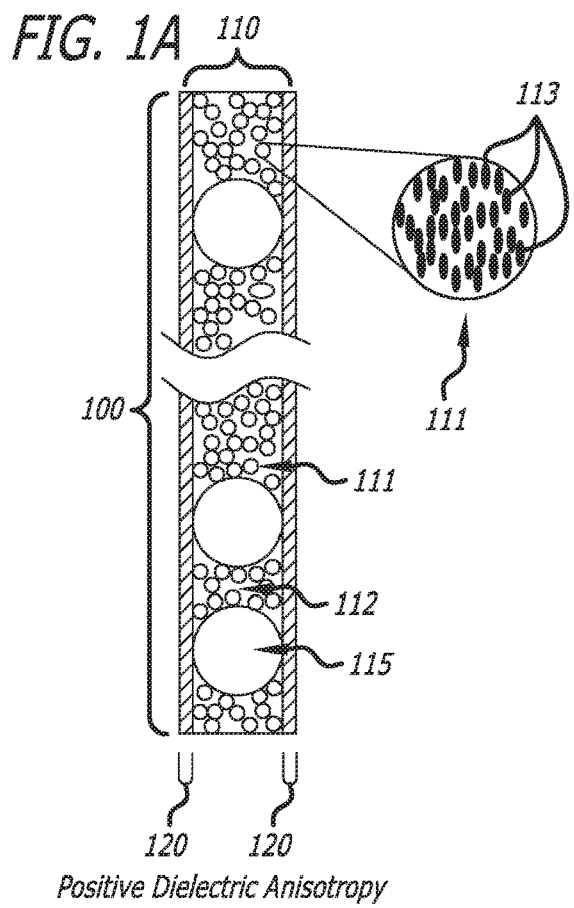
FIGS. 1A and 1B are depictions of two liquid crystal elements, showing the distinction between liquid crystals with positive and negative dielectric anisotropy.

Unless otherwise indicated, when a compound or chemical structural feature, such as alkyl, alkenyl, alkynyl, aryl, heteroaryl, etc., is referred to as being "optionally substituted," it includes a feature that has no substituents (i.e. unsubstituted), or a feature that is "substituted," meaning that the feature has one or more substituents. The term "substituent" has the broadest meaning known to one of ordinary skill in the art, and includes a moiety that occupies a position normally occupied by one or more hydrogen atoms attached to a parent compound or structural feature. In some embodiments, a substituent may be an ordinary organic moiety known in the art, which may have a molecular weight (e.g. the sum of the atomic masses of the atoms of the substituent) of 15-50 g/mol, 15-100 g/mol, 15-150 g/mol, 15-200 g/mol, 15-300 g/mol, or 15-500 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, S, Si, F, Cl, Br, or I; provided that the substituent includes one C, N, O, S, Si, F, Cl, Br, or I atom. Examples of substituents include, but are not limited to, alkyl, alkenyl, alkynyl, heteroalkyl, heteroalkenyl, heteroalkynyl, aryl, heteroaryl, hydroxy, alkoxy, aryloxy, acyl, acyloxy, alkylcarboxylate, thiol, alkylthio, cyano, halo, thiocarbonyl, O-carbamyl, N-carbamyl, O-thiocarbamyl, N-thiocarbamyl, C-amido, N-amido, S-sulfonamido, N-sulfonamido, isocyanato, thiocyanato, isothiocyanato, nitro, silyl, sulfenyl, sulfinyl, sulfonyl, haloalkyl, haloalkoxyl, trihalomethanesulfonyl, trihalomethanesulfonamido, amino, etc.

The term "alkyl" as used herein refers to a moiety comprising carbon and hydrogen containing no double or triple bonds. An alkyl may be linear, branched, cyclic, or a combination thereof, and contain from one to thirty-five carbon atoms. Examples of alkyl groups include but are not limited to methyl, ethyl, propyl, isopropyl, cyclopropyl, n-butyl, iso-butyl, tert-butyl, cyclobutyl, pentyl isomers, cyclopentyl, hexyl isomer, cyclohexyl, and the like. The term "linear alkyl" as used herein refers to —$(CH_2)_qCH_3$, where q varies between 0 to 30. The term "$C_{1-12}$ alkyl" as used herein refers to alkyl having from 1 to 12 carbon atoms such as but not limited to methyl, ethyl, propyl isomers, butyl isomers, cyclobutyl isomers, pentyl isomers, cyclopentyl isomers, hexyl isomers, cyclohexyl isomers, heptyl isomers, cycloheptyl isomers, octyl isomers, cyclooctyl isomers, nonyl isomers, cyclononyl isomers, decyl isomers, cyclodecyl isomers. undecyl isomers, cycloundecyl isomers, dodecyl isomers, cyclododecyl isomers. The term "alkylene" is a subgenus of "alkyl" and refers to a divalent alkyl moiety, e.g. —CH$_2$—, etc.

The term "alkoxy" as used herein refers to a moiety comprising an alkyl that is singularly bonded to an oxygen atom, the oxygen becoming the point of attachment for the moiety (i.e. —O—R). An alkoxy may be linear, branched, cyclic, or a combination thereof, and contain from one to thirty-five carbon atoms. When an alkoxy is branched the alkyl group comprising the alkoxy is a branched alkyl.

The terms "positive dielectric anisotropy", "negative dielectric anisotropy", and "neutral dielectric anisotropy" as used herein all have the broadest meanings generally understood in the art by those of ordinary skill in the art. The dielectric anisotropy is related to dielectric properties as well as optical properties depending on the direction, either along the length of the molecule, or perpendicular to the length of the molecule. The dielectric properties depend on the molecular shape and substituent moieties and their locations on a given molecule. A molecule is said to have a positive dielectric anisotropy if the dielectric constant parallel to the length of the molecule is greater than the dielectric coefficient perpendicular to the length of the molecule, wherein the length of a molecule is defined as vector between the two farthest moieties. A molecule is said to have a negative dielectric anisotropy if the dielectric constant perpendicular to the length molecule is greater than the dielectric coefficient parallel to the length of the molecule, wherein the length of a molecule is defined as vector between the two farthest moieties. A molecule is said to have a neutral dielectric anisotropy if the dielectric constant perpendicular to the length of the molecule is approximately the same as the dielectric coefficient parallel to the length of the molecule, where the length of a molecule is defined as vector between the two farthest moieties.

The terms "nematic phase", "smectic phase", and "isotropic phase" as used herein all have the broadest meanings generally understood in the art by those of ordinary skill in the art when referring to liquid crystal phases.

The current disclosure is described in detail below about liquid crystal compositions, polymer dispersed liquid crystal (PDLC) elements, selectively dimmable devices comprising PDLC elements, and methods of manufacturing these devices.

2. Liquid Crystal Composition

In some embodiments, a compound can be described as having both liquid and crystalline characteristics, e.g. a liquid crystal compound. A liquid crystal composition can comprise one or more liquid crystal compounds. A liquid crystal composition can exhibit a mesogenic liquid crystal phase. In some embodiments, the liquid crystal composition can comprise a liquid crystal compound with positive dielectric anisotropy, where the liquid crystal aligns parallel to the electric field. Upon application of an electric field, the positive charge is displaced to one end of the molecule and the negative charge to the other end, thus creating an induced dipole moment. This results in the alignment of the longitudinal axis of liquid crystal molecules mutually parallel to the electric field direction. In some embodiments, the liquid crystal composition can comprise a liquid crystal compound with negative dielectric anisotropy, where the liquid crystal aligns perpendicular to the electric field. The index of refraction is larger along with the long axis of the molecules than the perpendicular to it. The optical and dielectric anisotropies of liquid crystals enable the index of refraction to be controlled electrically. In some embodiments, the liquid crystal composition can comprise both liquid crystal compounds with positive dielectric anisotropy and liquid crystal compounds with negative dielectric anisotropy.

In some embodiments, a liquid crystal composition comprises a compound of Formula I.

With respect to any relevant structural representation, such as formula 1, X can be optionally substituted C$_{2-12}$ alkyl, optionally substituted C$_{1-12}$ alkyloxy, optionally substituted C$_{2-12}$ alkenyl, optionally substituted C$_{2-12}$ alkynyl. In some embodiments, X can be C$_{2-8}$ alkyl, or C$_{1-7}$ alkoxy. In some embodiments, X is:

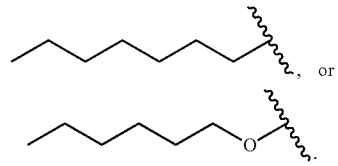

With respect to any relevant structural representation, such as formula 1, Y can be F, Cl, —CN, OH, NO$_2$, optionally substituted C$_{2-12}$ alkyl, optionally substituted C$_{1-12}$ alkoxy, —NR$^a$R$^b$, —NHCOR$^a$, —NHSO$_2$R$^a$, —OCOR$^a$, or —SO$_2$R$^a$; —C(O)R$^a$, —C(O)OR$^a$, —C(O)NHR$^a$, or —C(O)NR$^a$R$^b$. In some embodiments, Y can be —F, —CN, C$_{2-8}$ alkyl, or C$_{1-7}$ alkyloxy. In some embodiments, Y can be F. In some embodiments, Y can be —CN. In some embodiments, Y can be n-pentyl.

With respect to any relevant structural representation, such as formula 1, R$^1$, R$^2$, R$^3$, R$^4$, R$^5$, R$^6$ and R$^7$ can be independently H, F, Cl, —CN, OH, NO$_2$, C$_{1-6}$ alkyl, —NR$^a$R$^b$, —NHCOR$^a$, —NHSO$_2$R$^a$, —OCOR$^a$, or —SO$_2$R$^a$; —C(O)R$^a$, —C(O)OR$^a$, —C(O)NHR$^a$, or —C(O)NR$^a$R$^b$. In some embodiments, R$^1$, R$^2$, R$^3$ and R$^4$ can be independently H or C$_{1-3}$ alkyl. In some embodiments, R$^1$, R$^2$, R$^3$ or R$^4$ can be H. In some embodiments, R$^1$, R$^2$, R$^3$ or R$^4$ can be C$_{1-3}$ alkyl. In some embodiments, R$^1$ or R$^2$ can be H. In some embodiments, R$^1$ or R$^2$ can be CH$_3$. In some embodiments, R$^3$ or R$^4$ can be H. In some embodiments, R$^3$ or R$^4$ can be CH$_3$. In some embodiments, R$^5$, R$^6$ and R$^7$ can be independently H or F. In some embodiments, R$^5$ can be F. In some embodiments, R$^6$ or R$^7$ can be H. In some embodiments, R$^6$ or R$^7$ can be F.

With respect to any relevant structural representation, such as formula 1, in some embodiments, R$^1$ can be H. In some embodiments, R$^1$ and R$^2$ can be H. In some embodiments, R$^3$ can be C$_{1-3}$ alkyl such as CH$_3$. In some embodiments, R$^3$ and R$^4$ can be C$_{1-3}$ alkyl such as CH$_3$.

With respect to any relevant structural representation, such as formula 1, in some embodiments, R$^5$ can be F. In some embodiments, R$^6$ can be H. In some embodiments, R$^6$ can be F. In some embodiments, R$^7$ can be H. In some embodiments, R$^7$ can be F.

In some embodiments, the substituents, such as X, Y, R$^1$ thru R$^7$ of the compound of Formula I in the liquid crystal composition can result in a positive dielectric anisotropic compound. In some embodiments, the substituents, such as X, Y, R$^1$ thru R$^7$ of the compound of Formula I in the liquid crystal composition can result in a negative dielectric anisotropic compound.

In some embodiments, the liquid crystal composition can comprise one or more of the following compounds:

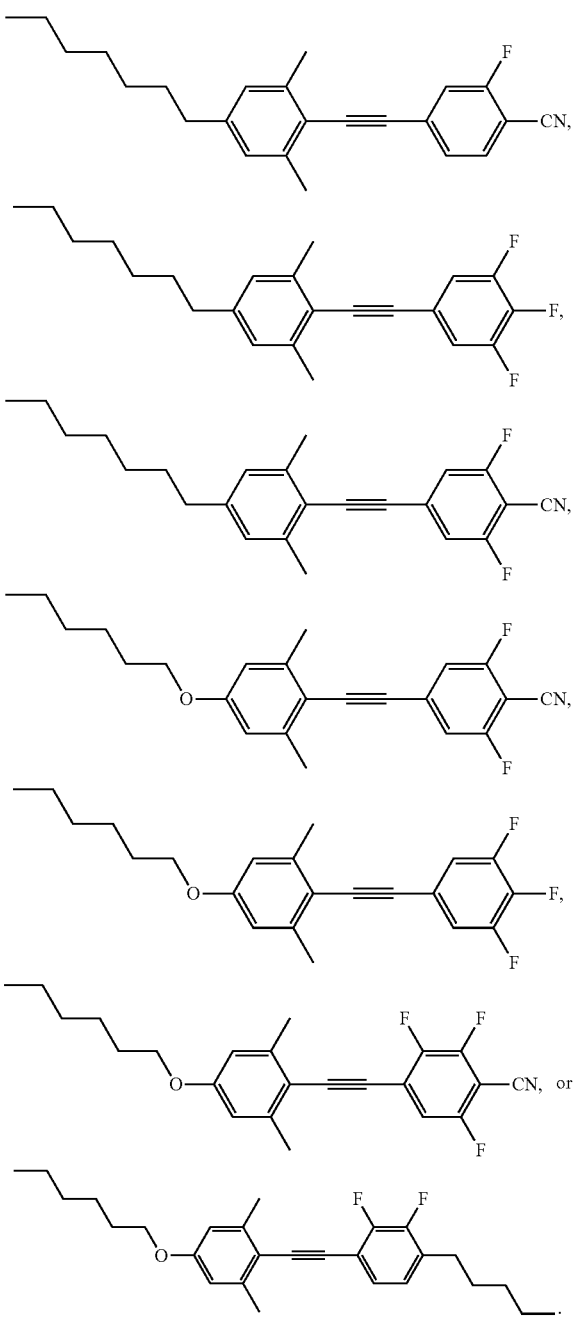

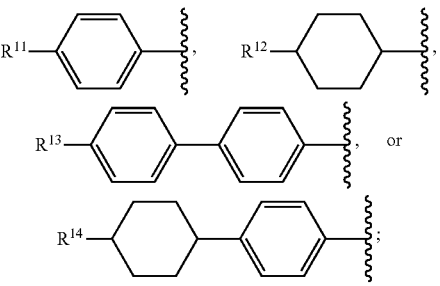

wherein $R^{11}$, $R^{12}$, $R^{13}$ and $R^{14}$ can be independently alkyl, alkoxy or any substituent. In some embodiments, $R^{11}$, $R^{12}$, $R^{13}$ and $R^{14}$ can be independently $C_{3-9}$ alkyl or $C_{3-9}$ alkoxy. In some embodiments, $R^{11}$, $R^{12}$, $R^{13}$ or $R^{14}$ can be $C_{3-9}$ alkyl, such as $C_5$ alkyl, $C_6$ alkyl, or $C_7$ alkyl. In some embodiments, $R^{11}$, $R^{12}$, $R^{13}$ or $R^{14}$ can be $C_{3-9}$ alkoxy, such as $C_8$ alkoxy.

With respect to any relevant structural representation, such as formula II, $Y^1$ can be $C_{1-6}$ alkyl, $C_{1-6}$ alkyloxy, —CN, —NCS, F, Cl, OH, $NO_2$, —$NR^aR^b$, —$NHCOR^a$, —$NHSO_2R^a$, —$OCOR^a$, —$SO_2R^a$; —$C(O)R^a$, —$C(O)OR^a$, —$C(O)NHR^a$, or —$C(O)NR^aR^b$. In some embodiments, $Y^1$ can be —CN or —NCS. In some embodiments, $Y^1$ can be —CN. In some embodiments, $Y^1$ can be —NCS.

In some embodiments, the mixture compounds of Formula II can comprise the following compounds:

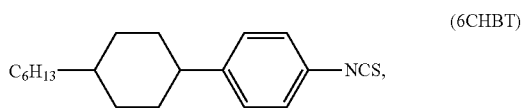
(6CHBT)

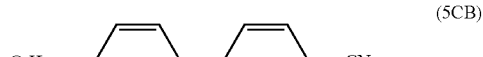
(5CB)

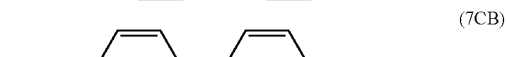
(7CB)

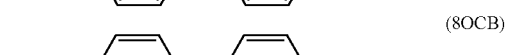
(8OCB)

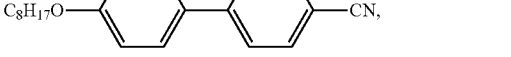
(5CCB)

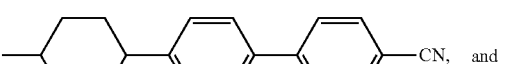
(5CT)

3. Liquid Crystal Mixture

Some embodiments include a nematic liquid crystalline mixture. The mixture can comprise an additional compound with liquid crystal properties (such as a second compound, a third compound, a fourth compound, etc.) in addition to a compound of Formula I. In some embodiments, the mixture compounds are the compounds of Formula II.

With respect to any relevant structural representation, such as formula II, $X^1$ can be substituted phenyl, substituted cyclohexane, substituted biphenyl, or substituted cyclohexyl-benzene. In some embodiments, $X^1$ can be:

In some embodiments, the liquid crystal mixture can comprise the aforementioned liquid crystal composition of Formula I and one or more compounds of Formula II, such as 6CHBT, 5CB, 7CB, 8OCB, 5CCB, or 5CT.

In some embodiments, the mass percentages of the individual compounds in the mixture are chosen such that the total weigh percentage of the liquid crystal mixture is equal to 100 wt %.

In some embodiments, the mass percentage of 6CHBT can be about 0-25 wt %, about 15-20 wt %, or about 20-25 wt %, such as about 15 wt %, about 17 wt %, about 19 wt %, about 20 wt %, or about 21 wt %.

In some embodiments, the mass percentage of 5CB can be about 30-70 wt %, about 35-40 wt %, about 40-55 wt %, or about 50-70 wt %, such as about 37 wt %, about 39 wt %, about 40 wt %, about 41 wt %, about 48 wt %, about 51 wt %, about 53 wt %, about 55 wt %, or about 65 wt %.

In some embodiments, the mass percentage of 7CB can be about 10-35 wt %, about 10-20 wt %, or about 20-30 wt %, such as about 13 wt %, about 15 wt %, about 16 wt %, about 17 wt %, about 18 wt %, about 21 wt %, about 23 wt %, about 25 wt %, or about 31 wt %.

In some embodiments, the mass percentage of 8OCB can be about 0-13 wt %, about 5-10 wt %, or about 10-12 wt %, such as about 6 wt % about 7 wt %, about 8 wt %, or about 12 wt %.

In some mixtures, the mass percentage of 5CCB can be about 0-16 wt %, or about 10-15 wt %, such as about 12 wt %, about 13 wt %, about 14 wt %, or about 15 wt %.

In some embodiments, the mass percentage of 5CT can be about 4-12 wt %, about 5-7 wt %, about 7-8 wt %, or about 8-11 wt %, such as about 6 wt %, about 7 wt %, about 8 wt %, or about 11 wt %.

For some mixtures, the mass percentage of 5CB can be from about 48 wt % to about 66 wt %, such as about 48 wt %, about 51 wt %, about 53 wt %, about 55 wt %, or about 66 wt %; the mass percentage of 7CB can be from about 18 wt % to about 31 wt %, such as about 18 wt %, about 21 wt %, about 23 wt %, about 24 wt %, about 25 wt %, or about 31 wt %; the mass percentage of 8OCB can be from about 5 wt % to about 12 wt %, such as about 6 wt %, about 7 wt %, about 8 wt %, or about 12 wt %; and the mass percentage of 5CT can be from about 7 wt % to about 11 wt %, such as about 7 wt %, about 8 wt %, or about 11 wt %; where the mass percentage of the individual compound in the mixture are chosen such that the total mass percentage of the liquid crystal mixture including the liquid crystal composition is 100 wt %.

In some mixtures, the mass percentage of 6CHBT can be from about 15 wt % to about 25 wt %, such as about 17 wt %, about 19 wt %, about 20 wt %, or about 21 wt %; the mass percentage of 5CB can be from about −37 wt % to about −41 wt %, such as about 37 wt %, about 39 wt %, about 40 wt %, or about 41 wt %; the mass percentage of 7CB can be from about 13 wt % to about 17 wt %, such as about 13 wt %, about 15 wt %, about 16 wt %, or about 17 wt %; the mass percentage of 5CCB can be from about 10 wt % to about 16 wt %, such as about 12 wt %, about 13 wt %, about 14 wt %, or about 15 wt %; and the mass percentage of 5CT can be from about 5 wt % to about 7 wt %, such as about 6 wt %, or about 7 wt %; where the mass percentages for individuals in the mixture are chosen such that the total percentage of the liquid crystal mixture including the liquid crystal composition is 100 wt %.

4. Liquid Crystal Element

Figure 1B:
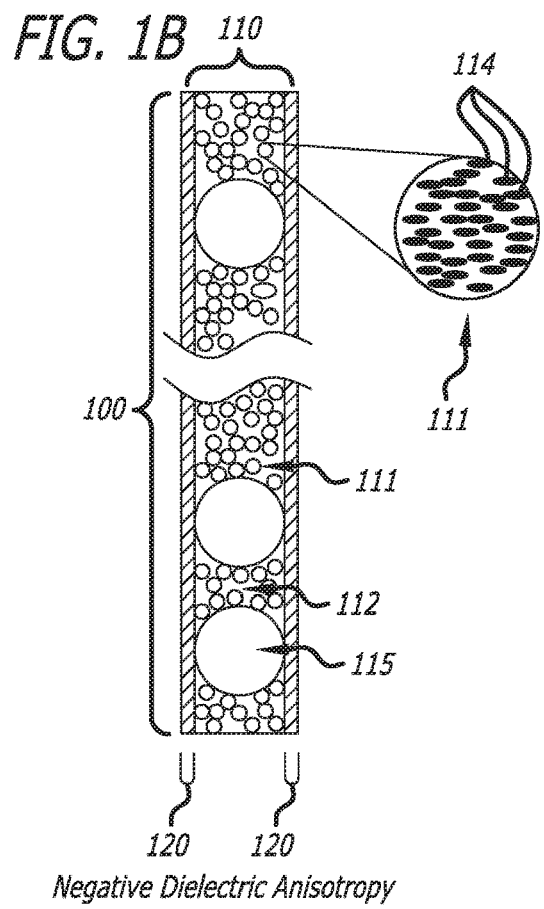

FIGS. 1A and 1B show two possible embodiments, each comprising a liquid crystal element, 100, one with positive dielectric anisotropy and the other with negative dielectric anisotropy. The liquid crystal element, e.g. liquid crystal element 100 can comprise a transparency changing layer, 110, and at least two alignment layers, 120, the alignment layers bounding each side of the transparency changing layer. The transparency changing layer defines two opposing surfaces which can be bounded by the first and second alignment layers respectively. In some embodiments, any of the above aforementioned layers can further comprise dispersants, plasticizers, binders, and/or solvents.

In some embodiments, the transparency changing layer, 110, can comprise a liquid crystal material, 111, and a polymer, 112. In some embodiments, the transparency changing layer can further comprise spacers, 115.

In some embodiments, the liquid crystal material can be dispersed in the polymer. As shown in FIGS. 1A and 1B. The liquid crystal material can be dispersed within the transparency changing layer such that the liquid crystal forms droplets, 111, suspended within the polymer matrix, 112. The transparency changing layer can be described as a polymer dispersed liquid crystal (PDLC). In some embodiments, the liquid crystal element is a reverse mode PDLC element, which can be transparent to visual light but opaque upon the application of an electric field In some embodiments, the liquid crystal material can comprise a positive dielectric anisotropic compound, 113 (FIG. 1A). In some embodiments, the liquid crystal material can comprise a negative dielectric anisotropic compound, 114 (FIG. 1B). In some embodiments, the liquid crystal material can comprise both a positive dielectric anisotropic compound and a negative dielectric anisotropic compound.

In some embodiments, the liquid crystal material can comprise one or more liquid crystal compounds of Formula I as described above.

In some embodiments, the liquid crystal material can comprise one or more of the following compounds:

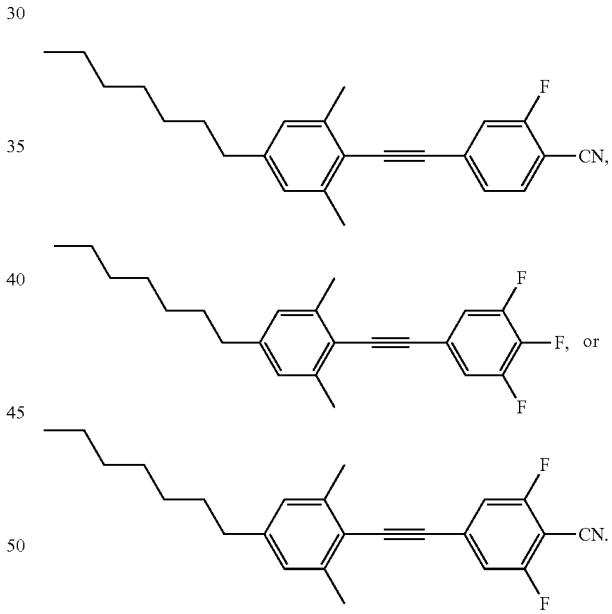

In some embodiments, the liquid crystal material can comprise one or more of the following compounds:

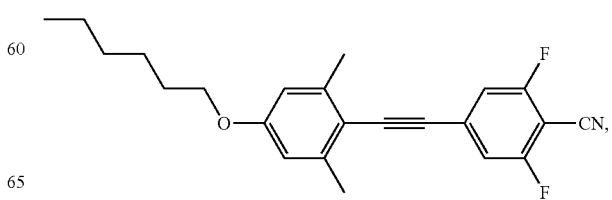

-continued

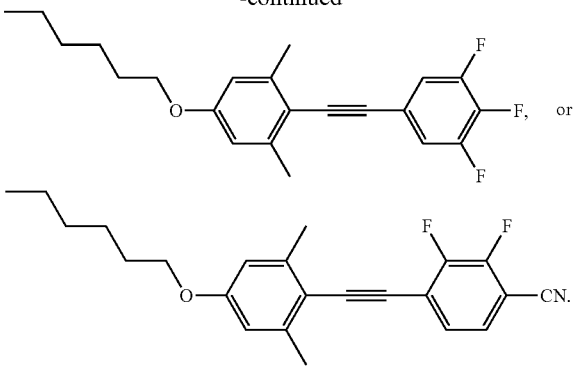

In some embodiments, the liquid crystal material can comprise the following compound:

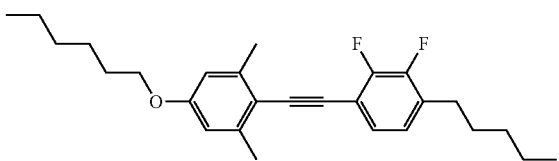

In some embodiments, the liquid crystal material can comprise a nematic liquid crystalline mixture.

In some embodiments, the liquid crystal material can comprise the aforementioned compounds of Formula I and one or more compounds of Formula II, such as 6CHBT, 5CB, 7CB, 8OCB, 5CCB, or 5CT.

In some embodiments, the liquid crystal materials with the mass ratios of the individual compounds of 6CHBT, 5CB, 7CB, 8OCB, 5CCB, or 5CT in the liquid crystal mixture as described above can be used in the liquid crystal elements.

In some embodiments, as shown in FIG. 1, the transparency changing layer 110 can comprise a liquid crystal material, 111, and a polymer, 112, where the liquid crystal composition is dispersed in the polymer. The polymer can comprise polymer precursors and initiators, which are then polymerized in situ. The polymer precursors may comprise monomers, oligomers, or any combination thereof, before polymerization. The polymer can be a photopolymer. The photopolymer can comprise polymer precursors and a photo-initiator. The polymer can be a thermoplastic polymer. The thermoplastic polymer can comprise polymer precursors and a thermal initiator. The photopolymer can comprise a UV-curable polymer or a visual light based photopolymer. The polymer can comprise a combination of a thermoplastic polymer and a photo/UV-curable polymer. In some embodiments, the ratio of liquid crystal compound to polymer can be about 25:1 to about 1:1 by weight, about 15:1 to about 3:1 by weight, about 10:1 to about 8:1; or about 9:1 by weight.

In some embodiments, the monomers can comprise styrene, vinyl ethers, N-vinyl carbazoles, lactones, lactams, cyclic ethers, cyclic acetals, cyclic siloxanes, or a combination thereof. The oligomer can comprise acrylates and/or methacrylates. The oligomer can comprise diethylene glycol diacrylate, diethylene glycol dimethacrylate, triethylene glycol diacrylate, diethylene glycol dimethacrylate, triethylene glycol diacrylate, triethylene glycol dimethacrylate, trimethylol propane, diallyl ether, trimethylolpropane triacrylate, pentaerythritol triacrylate, penaerithritol tetracrylate, pentaerythtol pentacrylate, dipentaerythrytol hydroxy pentacrylate, methyl methacrylate, acrylonitrile, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), 1,6-hexanediol diacrylate (HDDA), poly(ethylene glycol) dimethacrylate, or a combination thereof. The monomer can comprise Paliocolor® LC-242, Paliocolor® LC-756, Paliocolor® LC-1057, Merck RM-691, Merck R-811, Merck RM-257, or a combination thereof. The monomer can comprise BASF Paliocolor® LC-242, Merck RM 257, or both BASF Paliocolor® LC-242 and Merck RM 257.

In some embodiments, the photoinitiator can comprise a UV irradiation photoinitiator. The photoinitiator can also comprise a co-initiator. The photoinitiator can comprise an α-alkoxydeoxybenzoin, α,α-dialkyloxydeoxybenzoin, α,α-dialkoxyacetophenone, α,α-hydroxyalkylphenone, O-acyl α-oximinoketone, dibenzoyl disulphide, S-phenyl thiobenzoate, acylphosphine oxide, dibenzoylmethane, phenylazo-4-diphenylsulphone, 4-morpholino-α-dialkylaminoacetophenone, or a combination thereof. In some embodiments, the photoinitiator can comprise Irgacure® 184, Irgacure® 369, Irgacure® 500, Igracure® 651, Igracure® 907, Irgacure® 1117, Irgacure® 1700, Irgacure® TPO, 4,4'-bis(N,N-dimethylamino)benzophenone (Michlers ketone), (1-hydroxycyclohexyl) phenyl ketone, 2,2-diethoxyacetophenone (DEAP), benzoin, benzyl, benzophenone, or a combination thereof. In some embodiments, the photoinitiator can comprise a blue-green and/or red sensitive photoinitiator. In some embodiments, the blue-green and/or red photoinitiator can comprise Irgacure® 784, dye rose bengal ester, rose Bengal sodium salt, campharphinone, methylene blue and the like. In some embodiments, co-initiators can comprise N-phenylglicine, triethylamine, thiethanolamine, or a combination thereof. Co-initiators are employed to control the curing rate of the original pre-polymer such that material properties may be manipulated. In some embodiments, the photoinitiator can comprise an ionic photoinitiator. In some embodiments, the ionic photoinitiator can comprise a benzophenone, camphorquinone, fluorenone, xanthone, thioxanthone, benzyls, α-ketocoumarin, anthraquinone, terephthalophenone, or a combination thereof. In some embodiments, the photoinitiator can comprise Igracure® 907. In some embodiments, the photoinitiator can comprise Igracure® 651.

In some embodiments, the thermal initiator can comprise: 4,4'-Azobis(4-cyanovaleric acid) (ACVA); α,α-azobisisobutyronitrile; 1,1'-azobis(cyclohexanecarbonitrile) (ACHN); ammonium persulfate; hydroxymethanesulfinic acid monosodium salt dihydrate (sodium formaldehydesulfoxylate); potassium persulfate; sodium persulfate; tert-butyl hydroperoxide; tert-butyl peracetate; cumene hydroperoxide; 2,5-di(tert-butylperoxy)-2,5-dimethyl-3-hexyne; dicumyl peroxide; 2,5-bis(tert-butylperoxy)-2,5-dimethylhexane (Luperox® 101, Luperox® 101XL45); 2,4-pentanedione peroxide (Luperox® 224); 1,1-bis(tert-butylperoxy)-3,3,5-trimethylcyclohexane (Luperox® 231); 1,1-bis(tert-butylperoxy)cyclohexane (Luperox® 331M80, Luperox® 531M80); benzoyl peroxide (Luprox® A98, Luprox® AFR40, Luprox® ATC50); butanone peroxide (Luprox® DDM-9, Luprox® DHD-9); tert-butyl peroxide (Luprox® DI); lauroyl peroxide (Luprox® LP); tert-butyl peroxybenzoate (Luprox® P); tert-butylperoxy 2-ethylhexyl carbonate (Luprox® TBEC); tert-butyl hydroperoxide (Luprox® TBH70X), or a combination thereof.

In some embodiments, the liquid crystal element can also comprise a surfactant. The surfactant can comprise octanoic acid, heptanoic acid, hexanoic acid, and/or a combination thereof. In some embodiments, the surfactant can comprise acetylinic diol-based compounds, such as, for example, tetramethyl decynediol in a 2-ethyl hexanol solvent (Surfynol® 104A), ethoxylated acetylenic diols (Dynol® 604), dodecylbenzene sulfonate (Witconate® P-1059), Witcoamide® 511, Witcoamide® 5138, Surfynol® CT-171, Surfynol® CT-111, Surfynol® CT-131, Surfynol® TG, DBE Microemulsion, Fluorad® FC-431, Fluorad® FC-430, Surfynol® 104A, Dynol® 604, or a combination thereof.

In some embodiments, the transparency changing layer can be described as a polymer dispersed liquid crystal layer, where the liquid crystal material forms droplets within the polymer matrix. The liquid crystal droplets form as suspended precipitate during the polymerization of the polymer precursors. The droplets can have a uniform distribution, a gradient distribution, or a random distribution within the polymer matrix.

In some embodiments, as shown in FIG. 1, the transparency changing layer can also comprise spacers, e.g 115. In some embodiments, the spacers can comprise beads. Some spacers can be used to control the thickness of the liquid crystal element (i.e. defining the gap between the two alignment layers and the conducting substrates). Spacers may provide structural support to ensure a uniform thickness of the liquid crystal element. Some spacers can comprise silica dioxide (i.e. glass), or polymers, such as divinylbenzene, polymethylmethacrylate, polybuthymethacrylate, polymethylsilsesquioxane, polyaurylmethacrylate, polyurethane, polytetrafluoroethylene (Teflon), benzocyclobutene (BCB), amorphous fluoropolymer (Cytop), perfluorocyclobutene, or a combination thereof. In some embodiments, the spacer beads may have an average bead diameter. In some embodiments, the average bead diameter can be in a range of about 1 µm to about 60 µm, about 1 µm to about 50 µm, about 1 µm, about 5 µm, about 10 µm, about 15 µm, to about 20 µm, to about 50 µm, or any average bead diameter in a range bounded by any of these values. In some embodiments, the spacers can be dispersed in a random distribution. In some embodiments, the spacers can be dispersed uniformly. In some embodiments, the liquid crystal element may contain spacers with an average spacer density ranging from about 10 spacers/in$^2$ to about 1000 spacers/in$^2$. In some embodiments, the liquid crystal element may contain spacers with an average spacer density of about 10 spacers/in$^2$, about 20 spacers in$^2$, about 25 spacers/in$^2$, about 50 spacers/in$^2$ to about 100 spacers/in$^2$, about 200 spacers/in$^2$, about 500 spacers/in$^2$, about 1000 spacers/in$^2$, or any combination thereof.

In some embodiments of the liquid crystal element, as shown in FIG. 1, the alignment layers, e.g. 120, can be placed on each side of the transparency changing layer, e.g. 110, such that they sandwich transparency changing layer. In some embodiments, the alignment layers can be placed such that each alignment layer is in physical communication with the transparency changing layer (e.g., lining each side).

In some embodiments, the alignment layers can comprise a polyimide. In some embodiments, where the liquid crystal compound may be characterized as having a positive dielectric anisotropy, the polyimide can be chosen such that the aforementioned liquid crystal compound is homogenously aligned with the substrate, or oriented parallel to the substrate, when there is no voltage applied. In some embodiments, the homogenous-alignment polyimide can comprise a polyimide that can be characterized as having a low pre-tilt angle. The pre-tilt angle is the angle formed between the substrate and the direction along the length of the liquid crystal compound as a result of the presence of the polyimide. In some embodiments, the homogenous-alignment polyimide can comprise a polyimide that has a pre-tilt angle of less than about 15 degrees to less than about 5 degrees. In some embodiments, the homogenous-alignment polyimide can comprise: AL3056, AL16301, AL17901, PI-2525, PI-2555, PI-2574, SE-141, SE-150, SE-4540, SE-6441, SE-7792, SE-8292, LX-1400, or a combination thereof. In some embodiments, when a voltage is applied across the element the liquid crystals rotate from their pre-tilt positions in response to the application of an electric field resulting in a change of index of refraction due to the change in orientation of the individual molecules. The change in the liquid crystal index of refraction within the suspended liquid crystal droplets can result in an index of refraction mismatch between the droplets and the polymer resulting in a haze or loss of transparency in the element due to light scatter. In some embodiments, where the liquid crystal compound may be characterized as having a negative dielectric anisotropy, the polyimide can be chosen such that the aforementioned liquid crystal compound is homeotropically aligned with the substrate, or oriented perpendicularly to the substrate, when there is no voltage applied. In some embodiments, the homeotropic-alignment polyimide can comprise a polyimide that has a pre-tilt angle of about 85 degrees to about 90 degrees. In some embodiments the homeotropic-alignment polyimide can comprise a polyimide that has a pre-tilt angle of about 90 degrees. In some embodiments, the homeotropic-alignment polyimide can comprise of a polyimide selected from PI 1211, S60702, S659, SE-1211, SE-5300, SE-5661, or a combination thereof. In some embodiments, when the voltage is reduced or removed, the intermolecular interactions will drive to restore the individual liquid crystal compounds back to their original orientations, restoring the liquid crystal's index of refraction back to the original state and reducing mismatch and scattering in the device.

In some embodiments, the liquid crystal element can also comprise dispersants such as ammonium salts, e.g., $NH_4Cl$; Flowlen; fish oil; long chain polymers; steric acid; oxidized Menhaden Fish Oil (MFO); dicarboxylic acids such as but not limited to succinic acid, ethanedioic acid, propanedioic acid, pentanedioic acid, hexanedioic acid, heptanedioic acid, octanedioic acid, nonanedioic acid, decanedioic acid, o-phthalic acid, and p-phthalic acid; sorbitan monooleate; and mixtures thereof. In some embodiments, the dispersant can comprise oxidized MFO.

In some embodiments, the liquid crystal element can also comprise a plasticizer, including a type 1 plasticizer that can generally decrease the glass transition temperature (Tg), e.g. make it more flexible, such as a phthalate (n-butyl, dibutyl, dioctyl, butyl benzyl, mixed esters, and dimethyl); and type 2 plasticizers that can enable more flexible, more deformable layers, and may reduce the amount of voids resulting from lamination, e.g., glycols (polyethylene; polyalkylene; polypropylene; triethylene; dipropylglycol benzoate).

Type 1 plasticizers can include, but are not limited to: butyl benzyl phthalate, dicarboxylic/tricarboxylic ester-based plasticizers such as but not limited to phthalate-based plasticizers such as but not limited to bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as but not limited to bis(2-ethylhexyl) adipate, dimethyl adipate, monomethyl adipate, dioctyl adipate and mixtures thereof; sebacate-based plasticizers such as but not limited to dibutyl sebacate, and maleate.

Type 2 plasticizers can include, but not limited to: dibutyl maleate, diisobutyl maleate and mixtures thereof, polyalkylene glycols such as but not limited to polyethylene glycol, polypropylene glycol and mixtures thereof. Other plasticizers which may be used include but are not limited to benzoates, epoxidized vegetable oils, sulfonamides such as but not limited to N-ethyl toluene sulfonamide, N-(2-hydroxypropyl)benzene sulfonamide, N-(n-butyl)benzene sulfonamide, organophosphates such as but not limited to tricresyl phosphate, tributyl phosphate, glycols/polyethers such as but not limited to triethylene glycol dihexanoate, tetraethylene glycol diheptanoate and mixtures thereof; alkyl citrates such as but not limited to triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester, and mixtures thereof.

In some embodiments, the liquid crystal element can also comprise a binder, such as an organic binder, e.g. polyvinyl butyral (PVB), polyvinyl alcohol (PVA), polyvinyl chloride (PVC), polyvinyl acetate (PVAc), polyacrylonitrile, or a mixture and/or a copolymer thereof; polyethyleneimine; poly methyl methacrylate (PMMA); vinyl chloride-acetate; or a mixture and/or a copolymer thereof. In some embodiments, the organic binder can comprise PVB.

In some embodiments, the liquid crystal element can also comprise a solvent as part of the method of synthesizing the element. In some embodiments, the solvent can comprise a polar solvent. In some embodiments, the polar solvent can comprise water. In some embodiments, the solvent may comprise a non-polar solvent. In some embodiments, the non-polar solvent may be an organic solvent. In some embodiments, the non-polar solvent may include, but is not limited to, a lower alkanol such as but not limited to ethanol, methanol, isopropyl alcohol, xylenes, cyclohexanone, acetone, toluene and methyl ethyl ketone, and mixtures thereof. In some embodiments, the non-polar solvent may be toluene.

5. Selectively Dimmable Device

Figure 2:
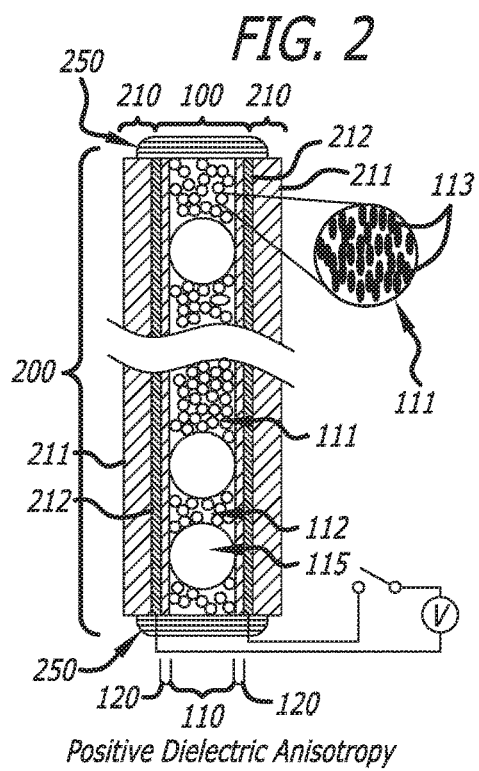
FIG. 2 is a depiction of an embodiment of a selectively dimmable device with a positive dielectric anisotropic polymer dispersed liquid crystal.
Figure 3:
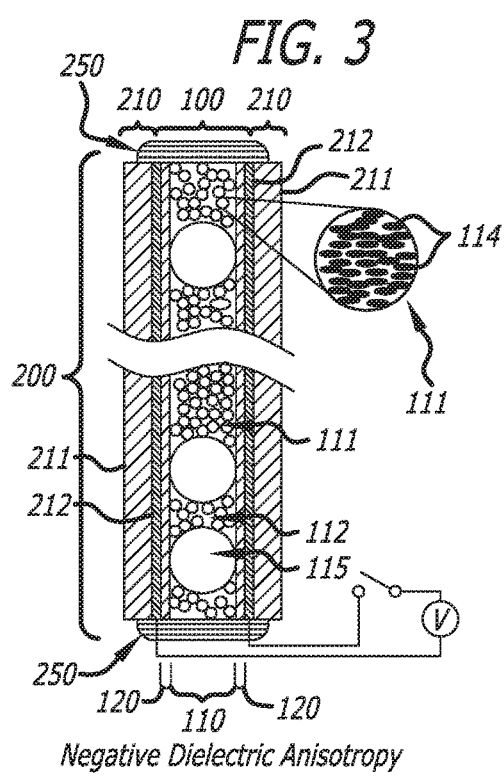
FIG. 3 is a depiction of an embodiment of a selectively dimmable device with a negative dielectric anisotropic polymer dispersed liquid crystal.

A liquid crystal composition or liquid crystal element can be incorporated into a selectively dimmable device. As shown in FIGS. 2 and 3, in some embodiments, a selectively dimmable device, such as selectively dimmable device 200, can comprise: at least two conductive substrates, e.g. conductive substrates 210, a liquid crystal element, e.g. liquid crystal element 100, and a voltage source. In some embodiments, the first and second conductive substrates can define a gap, and the liquid crystal element can be disposed within the gap. In some embodiments, the liquid crystal element, the conductive substrates, and the voltage source are in all in electrical communication such that upon the application of a voltage from the voltage source, an electric field is applied across the liquid crystal element.

In some embodiments, the conductive substrates can each comprise a base, e.g. base 211, where the base can be conductive. In some embodiments, each conductive substrate can further comprise an electron conductive layer, e.g. electron conductive layer 212, in addition to the base, where the electron conduction layer is in physical communication with the base. In some embodiments with electron conduction layers, the base can be non-conductive. In some embodiments, the device can further comprise a sealant, e.g. sealant 250, to protect the liquid crystal element from the environment. In some embodiments, the device can further comprise an adhesive layer, e.g. adhesive layer 260, and a removable backing, e.g. adhesive layer 261, to allow application to existing windows.

As shown in FIGS. 2 and 3, in some embodiments of the device the integrated liquid crystal element, e.g. liquid crystal element 100, can comprise a polymer matrix, e.g. polymer matrix 112, in which the polymer dispersed liquid crystal droplets 111, are suspended, all bound by two alignment layers 120. In some embodiments of the device, as shown in FIG. 2, the liquid crystal droplets can comprise a positive dielectric anisotropic compound 114. In other embodiments of the device, as shown in FIG. 3, the liquid crystal droplets can comprise a negative dielectric anisotropic compound 113. In still other embodiments, the liquid crystal droplets can comprise of a combination of positive and negative dielectric anisotropic compounds.

In some embodiments of the device, the liquid crystal element can be chosen such that under a condition when there is no induced electric field present, within the transparency changing layer, the index of refraction of the liquid crystal composition and the index of refraction of the polymer are similar relative to each other so that the total transmission of visible light allowed to pass through the device can be at least about 70%, at least about 75%, at least about 80%, at least about 85%, at least about 90%, and/or at least about 95%. In some embodiments, when there is an electric field present, e.g. due to a voltage applied to the electrical circuit, the index of refraction of the liquid crystal and the index of refraction of the polymer can vary relative to each other so that incident light is scattered and at most about 85% or less, about 80% or less, about 70% or less, about 65% or less, about 60% or less, about 50% or less, about 30% or less, about 25% or less, about 15% or less, about 10% or less, or about 5% or less of visible light is allowed to pass through the device. In some embodiments, the magnitude of the electric field necessary achieve scattering corresponds to applying a voltage of less than 120 V, less than 110 V, less than 50 V, less than 15V, less than 10 V, or less than 5V across the device. In some embodiments, the electric field across the device is less than about 500 kV/m, less than about 1,000 kV/m, less than about 5,000 kV/m, less than about 10,000 kV/m, less than about 20,000 kV/m, less than about 40,000 kV/m to less than about 80,000 kV/m. The effectiveness of dimming of the device can also be quantified in terms of percentage of haze, which generally can be defined as:

$$\text{Haze } [\%] = \frac{\text{Total Light Transmitted} - \text{Diffuse Light Transmitted}}{\text{Total Light Transmitted}} \times 100\%,$$

where the total light transmitted is the light from a known source and the diffuse light transmitted is the light transmitted through the element. In some embodiments, the haze of the device can be a maximum of about 5%, about 10%, about 15%, about 20%, about 25%, about 30% when no voltage is applied to the device. In some embodiments, the haze of the device can be at least about 20%, about 30%, about 35%, about 40%, about 50%, about 70%, about 75%, about 85%, about 90%, about 95%, when a voltage of 15 volts or less is applied to achieve scattering.

Figure 4:
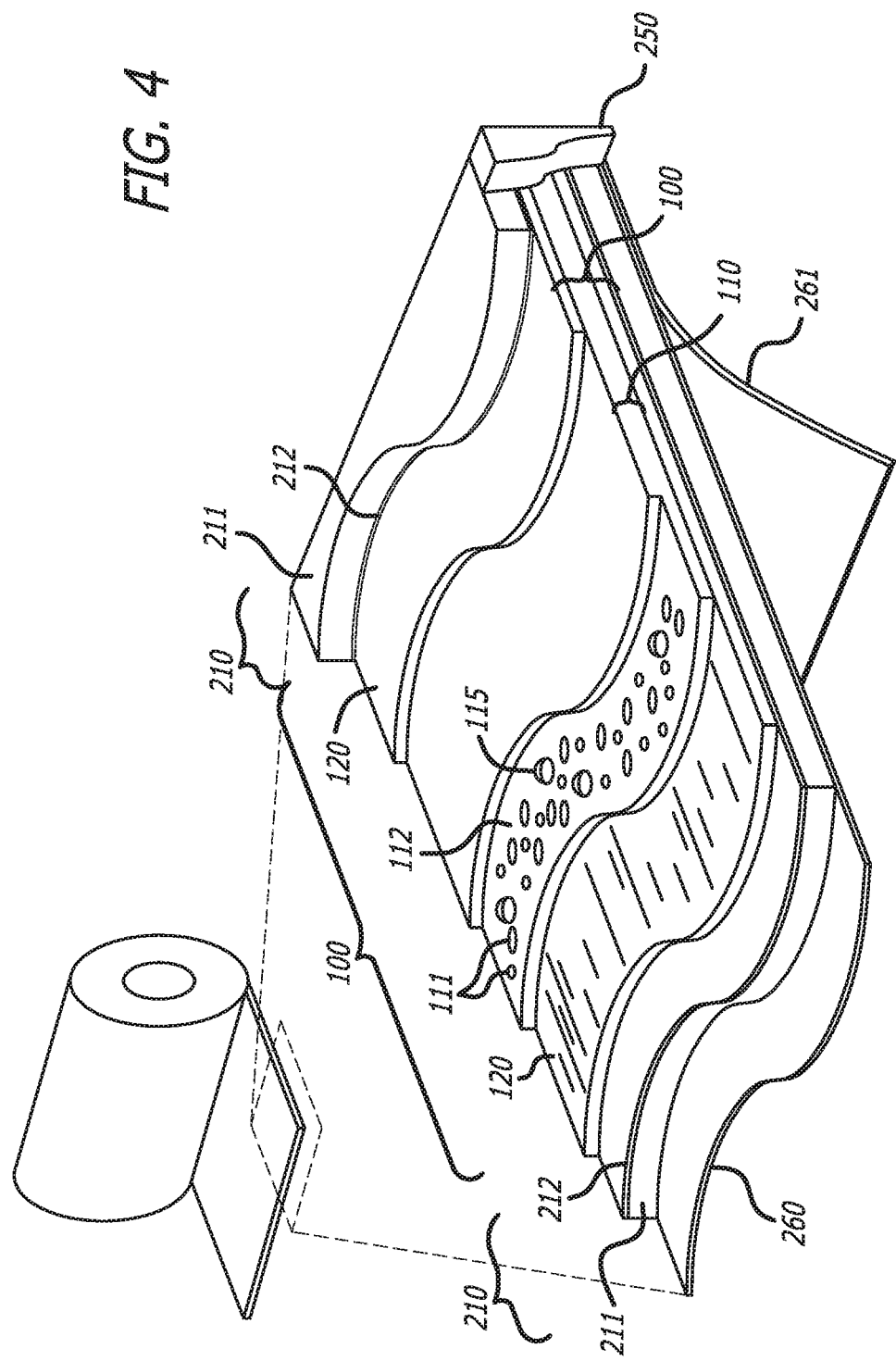
FIG. 4 is an embodiment of a selectively dimmable device where the device comprises a flexible film. Such a film may be used alone or may be applied on existing windows.

In some embodiments, the device can be semi-rigid or rigid. In some embodiments, the device can be flexible. In some embodiments, a selectively dimmable device can form a flexible sheet, as shown in FIG. 4, which can be applied between or on the surface of preexisting windows. In some embodiments, the conductive substrates can comprise flexible materials so that the aforementioned device may be a flexible film. In some embodiments, the flexible device may be placed in between or one side of pre-existing window glass to provide a dimming capability. In other embodiments, the device can be rigid, the base comprising inflexible materials.

In some embodiments, the conductive substrates, e.g. conductive substrate 210, can comprise a base, e.g. base 211. In some embodiments, the base can comprise of conductive material. In some embodiments, the conductive material can comprise a conductive polymer. In some embodiments, the conductive polymer can comprise poly(3,4-ethylenedioxythiophene) (PEDOT), PEDOT: poly(styrene sulfonate) (PSS), and/or a combination thereof.

In some embodiments, each conductive substrate can further comprise an electron conduction layer, e.g. conduction layer 212, where the layer is in physical communication with the base. In some embodiments, the electron conduction layer is placed in direct physical communication with the base, such as a layer on top of the base. In other embodiments, the electron conduction layer may be impregnated directly into the base (e.g. ITO glass), or sandwiched in between two bases to form a single conductive substrate. In some embodiments, where there is an electron conduction layer present the base can comprise a non-conductive material. In some embodiments, non-conductive material can comprise glass, polycarbonate, polymer, or a combination thereof. In some embodiments, the substrate polymer can comprise polyvinyl alcohol (PVA), polycarbonate (PC), an acrylic including but not limited to Poly(methyl methacrylate) (PMMA), polystyrene, allyl diglycol carbonate (e.g. CR-39), polyesters, polyetherimide (PEI) (e.g. Ultem®), Cyclo Olefin polymers (e.g. Zeonex®), triacetylcellulose (TAC), polyethylene terephthalate (PET), polyethylene naphthalate (PEN), or a combination thereof. In some embodiments, the substrate can comprise polyethylene terephthalate (PET), polyethylene naphthalate (PEN), or a combination thereof. In some embodiments, the electron conduction layer can comprise a transparent conductive oxide, conductive polymer, metal grids, carbon nanotubes (CNT), graphene, or a combination thereof. In some embodiments, the transparent conductive oxide can comprise a metal oxide. In some embodiments, the metal oxide can comprise iridium tin oxide (IrTO), indium tin oxide (ITO), fluorine doped tin oxide (FTO), doped zinc oxide, or a combination thereof. In some embodiments, the metal oxide can comprise indium tin oxide incorporated onto the base, e.g. ITO glass, ITO PET, or ITO PEN.

In some embodiments, as shown in FIGS. 2 and 3, the selectively dimmable device can also comprise a sealant, e.g. sealant 250. In some embodiments, the sealant can encapsulate liquid crystal element between the conductive substrates to protect the element from the environment. In some embodiments, the sealant can comprise a two-part real time cure epoxy, 3-Bond 2087, or the like. In some embodiments, the sealant can comprise a UV-curable photopolymer, such as NOA-61, or the like. In some embodiments, as shown in FIG. 4, the selectively dimmable device can also comprise an adhesive layer, e.g. adhesive layer 260. In some embodiments, the adhesive layer will allow a flexible sheet embodiment of the aforementioned device to be installed on pre-existing windows. In some embodiments, the adhesive can comprise an optically clear adhesive (OCA). In some embodiments, the OCA can comprise OCA products commercially available and known to those skilled in the art (e.g. Nitto OCA tape, Scapa OCA tape). In some embodiments, the selectively dimmable device can also comprise a removable carrier substrate, e.g. carrier substrate 261, to protect the adhesive layer from contamination. The carrier substrate may be peeled away before the device's application.

6. Methods for Manufacturing a Selectively Dimmable Device

Figure 5:
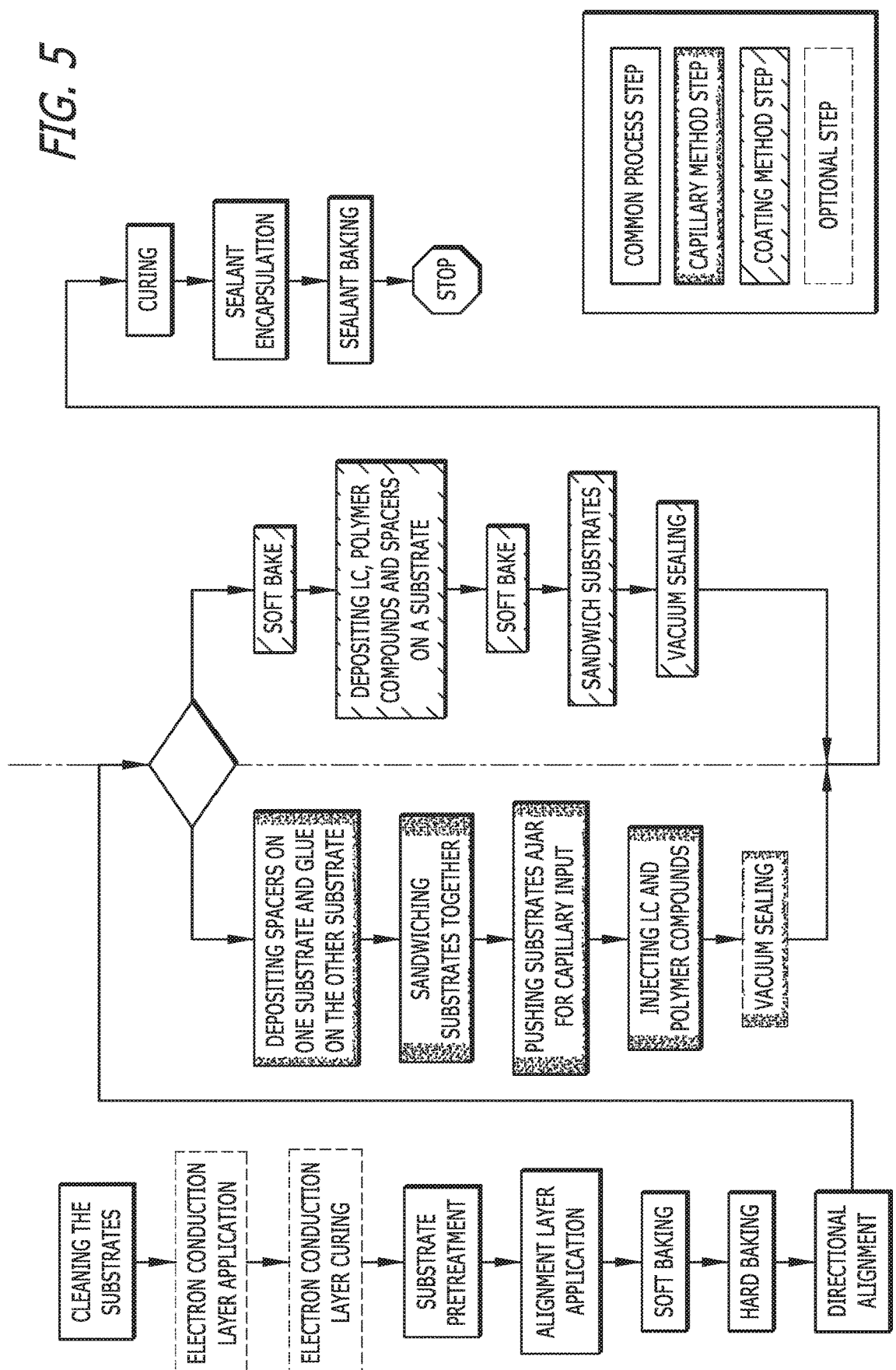
FIG. 5 is a diagram of the method embodiments for manufacturing selectively dimmable devices.

The aforedescribed selectively dimmable device may be prepared using conventional techniques known by a person skilled in the art. Alternatively, in some embodiments, a method is disclosed for manufacturing the aforementioned dimmable device. In some embodiments, a method is disclosed involving using capillary action to introduce the liquid crystal compound, or the capillary method, comprising: substrate pretreatment; applying an alignment layer coating on each substrate; soft-baking each substrate; hard-baking each substrate; directional alignment of each substrate; depositing spacers on one substrate and applying glue to the other substrate; sandwiching the substrates together to create an assembly; pushing the substrates ajar to create a rubbing axis; curing the assembly; injecting a liquid crystal composition, polymer precursors and initiators through capillary action; curing/polymerization of the compounds, and sealing the device. In some embodiments, the method further comprises cleaning the substrates at the outset. In some embodiments, the method further comprises vacuum sealing the assembly after sandwiching. In some embodiments, the capillary method is one similar to the steps identified in the diagram FIG. 5 for capillary method.

In some embodiments, the substrates may be optionally cleaned. The substrates can be cleaned using methods known to those skilled in the art to ensure minimal impurities are present on the substrate surface.

In some embodiments, the inward surface of the substrates, forming the bounds the device (i.e. similar to two plates of glass forming the gap in a double-pane window), may be optionally coated with an electron conduction layers. In some embodiments, the electron conduction layers can be applied by methods known to those skilled in the art such as by blade coating, spray coating, dip coating, spin coating, pulsed laser deposition, electrohydrodynamic deposition, or sputtering of the electron conduction solution. Next, the substrates can then be dried to cure the solution on the surface. The substrates may be heated to a temperature of about at least 500° C. to about 650° C. for at least 5 minutes to cause the film to become a crystalline transparent film. The result is conductive substrate. In some embodiments, the substrate is purchased with the conductive film already present on or impregnated in the substrate (e.g. ITO glass).

In some embodiments, the conductive substrate can then be pretreated by heating the substrates to a temperature of between about 150° C. to about 250° C. for about 15 minutes to about 1 hour. In some embodiments, the ITO-coated substrate can then be pretreated by heating the substrates to a temperature of about 200° C. for about 30 minutes. The result is a pretreated substrate.

In some embodiments, each pretreated substrate can then be coated with alignment material to create an alignment layer on the substrate's inward surface. In some embodiments, the coating can be done by methods known to those skilled in the art. In some embodiments, the alignment layers can be applied by methods known to those skilled in the art such as by blade coating, spray coating, dip coating, spin coating, pulsed laser deposition, electrohydrodynamic deposition or sputtering. In some embodiments, the alignment layers can be applied using spin coating at a setting of about 300 rpm to about 2000 rpm for a duration of between about 5 seconds to about 15 seconds, or about 10 seconds. The result is a coated substrate.

In some embodiments, after spin coating, the coated substrate can be soft baked. Soft baking is where the substrate is baked with a hot plate under the weight of gravity alone. In some embodiments, soft baking can be done at a temperature of between about 50° C. to about 120° C. for between about 10 minutes to about 3 minutes. In some embodiments, soft baking can be done at a temperature of about 80° C. for about 5 minutes. The result is a soft-baked substrate.

In some embodiments, the soft-baked substrate can then be hard baked. Hard baking is where the substrate is baked under a vacuum pressure holding the substrate to the hot plate to prevent warping. In some embodiments, hard baking can be done at a temperature of between about 150° C. to about 300° C. for a duration of between about 15 minutes to about 1 hour. In some embodiments, hard baking can be done at about 250° C. for about 30 minutes. The result is an alignment-cured substrate.

In some embodiments, the alignment-cured substrates can then be directionally aligned. The alignment can be done using methods known by those skilled in the art such as physical rubbing, chemical self-assembly, chemical alignment, magnetic alignment or photo alignment. In some embodiments, the alignment can be done by physically rubbing using a cloth to physically rub the alignment layer of each substrate. In some embodiments, the cloth may comprise velvet, cotton, rayon, felt, or the like (e.g. YA-18-R). In some embodiments, cloth can be mechanically rubbed against the alignment layers by placing the cloth on the surface of the roller and rolling the roller against the layer such that the cloth is in minimal physical communication with the surface of the layer. In some embodiments, the roller of diameter ranging from about 1 in to about 1 m may be rotated at a rate of between about 500 rpm to about 1500 rpm while the layer is translated past the roller at a rate of between about 0.1 mm/s to about 10 mm/s. In some embodiments, the roller may be rotated at a rate of about 1000 rpm. In some embodiments, the cloth can be translated across the substrate at the desired velocity to simulate rubbing. In some embodiments, multiple passes of rubbing can be performed, for a total of two passes, of three passes, or of four passes, to achieve the desired alignment. The result is a rubbed substrate.

In some embodiments, spacers can then be inserted between the substrates. In some embodiments, the spacers can comprise plastic or glass beads applied to one substrate. In some embodiments, the spacers can be applied by methods known by those skilled in the art such as but not limited to particle deposition or spraying.

In some embodiments, a glue or resin can then be applied around the edge of the substrates, where the sides are sealed and one end is open with the opposite end partially sealed with an air gap to allow air to escape. In some embodiments, the glue or resin can be applied around all the edges of the substrates. In some embodiments, the glue or resin can be ultra-violet (UV) curable glue. In some embodiments, the UV-curable glue can be a UV-cured epoxy formulation.

In some embodiments, the two substrates can then be sandwiched against each other such that the spacer impregnated surface is touching the side of the other substrate that has the glue or resin. In some embodiments, the substrates can then be pushed against each other to parallel to the axis of the sealed sides and along the rubbing axis such that the substrates are ajar enough to facilitate injection of material by capillary action into one of the unsealed sides. In other embodiments, the substrates remain aligned and are not pushed ajar. The result is a substrate assembly.

In some embodiments, the substrate assembly can then be optionally vacuum sealed after deposition of the mixture coating but before curing of the substrate assembly. In some embodiments, the substrate assembly can be vacuum sealed by placing the substrate assembly into a plastic bag and then placing the contents of the bag under vacuum conditions. In some embodiments, the vacuum sealing is done for about 2 minutes to about 5 minutes, such that a seal between the individual constituents of the assembly can be ensured. In some embodiments, vacuum sealing the substrate assembly may help to provide a uniform pressure so that the substrate has a uniform thickness.

In some embodiments, the resin or glue can then be cured. In some embodiments, where the glue can be UV-curable glue, the curing can be done by exposing the bonded substrates to a UV light source with an intensity at the irradiated surface of about 2 mW/cm$^2$ to about 20 mW/cm$^2$. In some embodiments, the intensity of the UV light source at the irradiated surface can be about 10 mW/cm$^2$. In some embodiments, the UV light source can comprise a light with a peak transmission between about 200 nm to about 400 nm. In some embodiments, the UV light source can comprise a light with a peak transmission of about 365 nm. In some embodiments, the UV curing can be for an interval lasting between about 2 minutes to about 10 minutes per side. In some embodiments, the curing can be done by exposing the assembly to a UV light source that can have an intensity at the irradiated surface of about 10 mW/cm$^2$ for about 5 minutes per side. The result is a cured substrate assembly.

In some embodiments, the aforementioned liquid crystal composition, polymer precursors and initiators can then be injected into the channels formed by the spacers in between the substrates in the cured substrate assembly. In some embodiments, the liquid crystal composition and polymer precursors and initiators can be induced by capillary action into the spaces in between the substrates. In some embodiments, the precursors and initiators can be UV-curable. In some embodiments, once the liquid crystal composition, precursors, and initiators are in place between the substrates, the resulting assembly can then be cured by a UV-light source UV light source with an intensity at the irradiated surface of about 5 mW/cm$^2$ to about 25 mW/cm$^2$ resulting in a polymer matrix. In some embodiments, the intensity of the UV light source at the irradiated surface can be about 10 mW/cm$^2$. In some embodiments, the UV light source can comprise a light with a peak transmission between about 200 nm to about 400 nm. In some embodiments, the UV light source can comprise a light with a peak transmission of about 365 nm. In some embodiments, the resulting assembly is cured by exposure of a UV light source at about 10 mW/cm$^2$ to about 20 mW/cm$^2$. In some embodiments, the curing can be done in multiple intervals. In some embodiments, the curing can be done in two intervals. In some embodiments, the duration of a single interval may range from about 1 minute to about 10 minutes. In some embodiments, the duration of a single interval may range from about 1 minute to about 5 minutes, or about 3 minutes. In some embodiments, the assembly can be flipped in between intervals. In some embodiments, the curing can be done without flipping the substrate assembly. In some embodiments, in between intervals, the assembly support can be changed to minimize secondary heating of the assembly during curing. The result is an unsealed dimmable assembly.

In some embodiments, the edges of the unsealed dimmable assembly can then be sealed with a sealant to protect the liquid crystal composition and the polymer matrix from the external environment. In some embodiments, after applying the sealant, the assembly can then be baked at a temperature of between about 50° C. to about 120° C. for between about 15 minutes to about 1 hour. In some embodiments, baking can be done at a temperature of about 80° C. for about 30 minutes. The result is a sealed dimmable assembly.

In some embodiments, the substrates of the sealed dimmable assembly can then be connected with a means of providing electrical communication to a voltage source such that when there is a voltage applied, an electrical field is generated between the substrates or across the device. The result is a selectively dimmable device.

In other embodiments, another method is disclosed involving applying the liquid crystal compound in a layer, or the layer method, the method comprising: substrate pretreatment; applying an alignment layer coating on each substrate; soft-baking each substrate; hard-baking each substrate; directional alignment of each substrate; depositing the liquid crystal compound, polymer precursors, initiator, and spacers on one substrate; sandwiching the substrates together to create an assembly; curing/polymerization of the compounds, and sealing the device. In some embodiments, the method further comprises cleaning the substrates at the outset. In some embodiments, the method further comprises vacuum sealing the assembly after sandwiching the substrates. In some embodiments, the layer method is one similar to the steps identified in the diagram FIG. 5 for layer method.

In other embodiments of the method of making a selectively dimmable device, a method similar to the aforedescribed capillary method is disclosed with the differences described herein. In some embodiments, instead of being deposited by capillary action, the liquid crystal compound, polymer precursors, and initiator, and optionally spacers, all defining a mixture can be deposited onto the inward surfaces of the substrates after rubbing but before the substrates are joined and cured. In some embodiments, mixture can be applied by blade coating, spray coating, dip coating, spin coating, pulsed laser deposition, electrohydrodynamic deposition, sputtering or a combination thereof. In some embodiments, the spacers can also be deposited along with the mixture. In some embodiments, the device can also be soft baked before mixture application and before joining of the two substrates. In some embodiments, the substrates can be placed so that they are not ajar with respect to each other. In some embodiments, before curing, the substrates can also be vacuum sealed.

EXAMPLES

It has been discovered that embodiments of the liquid crystal compositions, related reverse-mode polymer dispersed liquid crystal elements, and devices described herein provide the ability for a selectively dimmable surface. These benefits are further demonstrated by the following examples, which are intended to be illustrative of the embodiments of the disclosure, but are not intended to limit the scope or underlying principles in any way.

In general, the preparation of the compounds was performed under an argon atmosphere (Airgas, San Marcos, Calif. USA) inside of a glove-box. In addition, where degassing is applied during the synthesis of the compounds, it can be performed by bubbling of argon gas (Airgas) through the reaction solutions or by applying vacuum followed by purging argon gas and repeating the process a few times.

Example 1.1: Synthesis of 2-ethynyl-5-heptyl-1,3-dimethylbenzene: Precursor P-1

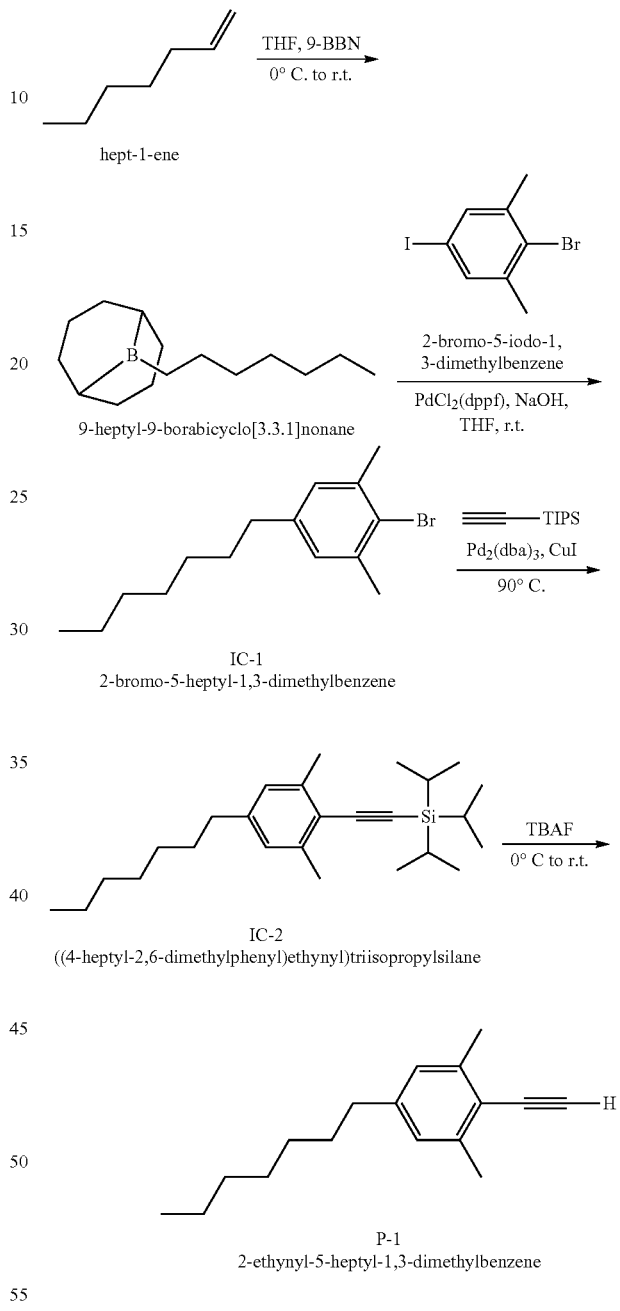

To a solution of 1-heptene (3.24 g, 33.0 mmol, Sigma Aldrich, St. Louis, Mo. USA) in THF (15 mL, Aldrich) was added dropwise a solution of 9 borabicyclo[3,3,1]nonane (9-BBN) in THF (0.5 M, 66.0 mL, 33.0 mmol, Aldrich) at 0° C. The mixture was then gradually warmed to room temperature and stirred for another 4 hours to give a B-heptyl-9-BBN solution, which was used in situ without further treatment. Next, to a mixture of 2-bromo-5-iodo-1,3-dimethylbenzene (9.30 g 30.0 mmol, Oakwood Chemical, Estill, S.C. USA) and PdCl$_2$(dppf) (734 mg, 0.9 mmol, Aldrich) at 0° C. was added THF (150 mL, Aldrich), aqueous NaOH (30 mL, 3 M, Aldrich) and the B-heptyl-9-BBN solution in successive fashion. The resulting mixture was then warmed to room temperature and stirred for 12 hours. H₂O₂ (30%, 12 mL, Aldrich) was then added and the resulting mixture was extracted with hexane (Aldrich), and the layers were separated. The organic layer was washed with brine (Aldrich), dried over anhydrous MgSO₄ (Aldrich), filtered, and concentrated under reduced pressure. The resulting crude product was then purified by silica gel column chromatography (hexane, R$_f$=0.46) and further purified by distillation by vacuum sublimation (0.15 mm Hg, at 100° C. to 105° C.) to yield 2-bromo-5-heptyl-1,3-dimethylbenzene as an intermediate compound 1 (IC-1).

Next, Pd₂(dba)₃ (600 mg, 0.655 mmol, Aldrich) and CuI (600 mg, 3.16 mmol, Aldrich) were added to 1,4-dioxane (75 mL, Aldrich) and the mixture was degassed for 20 minutes. P(t-Bu)₃ (24 mL; 10% solution in hexanes, Aldrich) was added with subsequent degassing for another 10 minutes. Then, IC-1 (12.09 g, 42.7 mmol) and triisopropylsilylacetylene (31.09 g, 171 mmol, Aldrich) was added and the reaction mixture was further degassed for 20 minutes. The mixture was then heated at 90° C. for 36 hours under an argon atmosphere. The mixture was cooled down, and poured into diethyl ether (~200 mL, Aldrich). The solids precipitated were then filtered off and the resulting filtrate was concentrated and purified by flash column chromatography (silica gel; 100% hexane to 10% ethyl acetate in hexane as gradient) to yield ((4-heptyl-2,6-di methylphenyl) ethynyl)-triisopropylsilane (IC-2).

Next, IC-2 (13.18 g, 34.3 mmol) was dissolved in THF (50 mL, Aldrich) and cooled to 0° C. by ice bath. Tetrabutylammonium fluoride (TBAF) (38 mL of 1M solution, 38 mmol, Aldrich) was then added slowly to the above solution containing IC-2. After the addition, the ice bath was removed, and the reaction mixture was stirred at room temperature for 70 minutes. The resulting solution was then poured into a saturated ammonium chloride aqueous solution (300 mL, Aldrich) and extracted twice with diethyl ether (150 mL, Aldrich). The layers were separated, and the organic layer was then dried with sodium sulfate (Aldrich), filtered and concentrated. Purification of the resulting residue by flash column chromatography yielded 2-ethynyl-5-heptyl-1,3-dimethylbenzene as precursor 1 (P-1).

Examples 1.2: Synthesis of 2-ethynyl-5-pentylbenzene: Precursor P-2

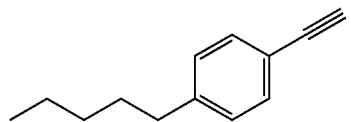

P-2

The synthetic procedure is substantially similar to the procedure described in Example 1.1 with the exception that 1-bromo-4-pentylbenzene (Aldrich), instead of IC-1, was used as a starting material.

Example 1.3: Synthesis of 2-ethynyl-5-(hexyloxy)-1,3-dimethylbenzene: Precursor P-3

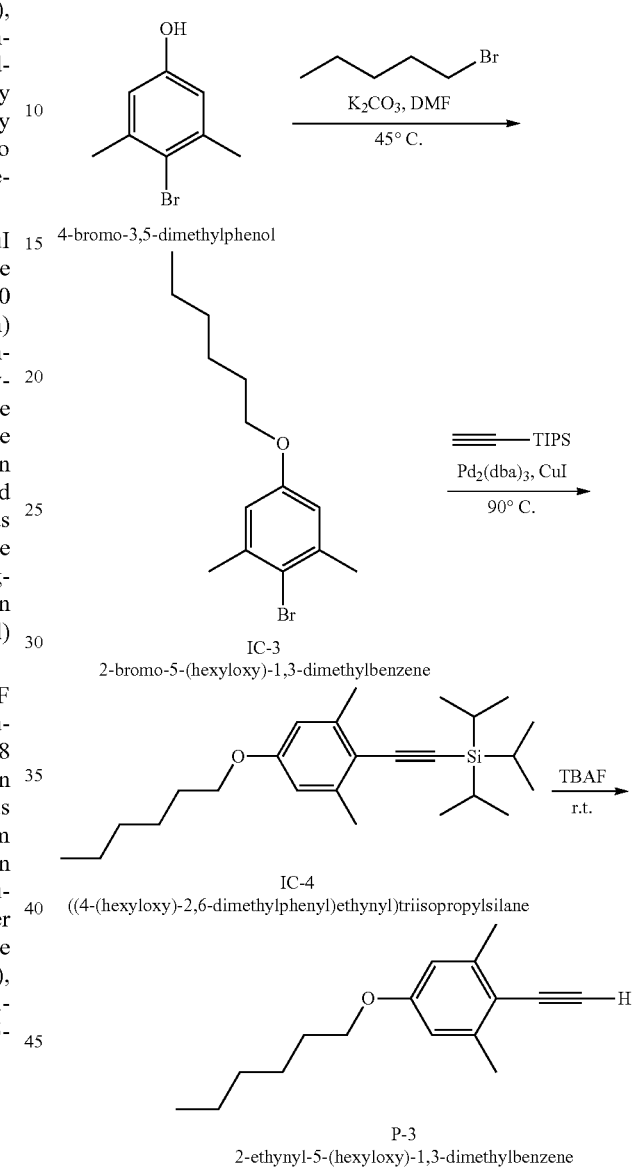

4-bromo-3,5-dimethylphenol (10.05 g, 50.0 mmol, Aldrich), K₂CO₃ (9 g, 65.2 mmol) (Aldrich) and DMF (25 mL, Aldrich) were mixed, and the resulting mixture was stirred for 10 minutes. 1-bromohexane (8.20 g, 50 mmol, Aldrich) was added and the reaction mixture was then heated at 45° C. overnight under argon atmosphere. After cooling to room temperature, the reaction mixture was then poured into dichloromethane (~300 mL, Aldrich); any solids precipitated were then filtered off. The filtrate was concentrated and then purified by flash column (silica gel; 100% hexane) to give 2-bromo-5-(hexyloxy)-1,3-dimethylbenzene as IC-3.

Pd₂(dba)₃ (600 mg) and CuI (600 mg) were added to 1,4-dioxane (75 mL) and then the mixture was degassed for 20 minutes. P(t-Bu)₃ (24 mL; 10% solution in hexanes) (Aldrich) was added with subsequent degassing for 10 minutes. Then, IC-3 (12.13 g, 42.7 mmol) and triisopropylsilylacetylene (31.09 g, 171 mmol) were added, and the mixture was further degassed for 20 minutes. The reaction mixture was then heated at 90° C. for 36 hours under an argon atmosphere. The mixture was then cooled down, and poured into diethyl ether (~200 mL) (Aldrich). The solids formed were filtered off, concentrated and the resulting residue was purified by flash column (silica gel; 100% hexane to 10% ethyl acetate in hexane as gradient) to yield ((4-(hexyloxy)-2,6-dimethylphenyl)ethynyl)triisopropylsilane as IC-4.

IC-4 (13.25 g, 34.3 mmol) was dissolved in THF (50 mL) (Aldrich) and cooled to 0° C. by ice bath. Tetrabutylammonium fluoride (TBAF) (38 mL of 1M solution, 38 mmol) (Aldrich) was added slowly to the above solution containing IC-4. After the addition, the ice bath was removed, and the reaction mixture was stirred at room temperature for 70 minutes. The resulting solution was then poured into a saturated ammonium chloride solution (300 mL, Aldrich) and extracted twice with diethyl ether (150 mL, Aldrich). The layers were separated and the organic layer was then dried over sodium sulfate (Aldrich), filtered, concentrated to give a residue. Purification of the residue by flash column yielded 2-ethynyl-5-(hexyloxy)-1,3-dimethylbenzene as precursor 3 (P-3).

Example 1.4: Synthesis of 1-bromo-2,3-difluoro-4-pentylbenzene: Precursor (P-4)

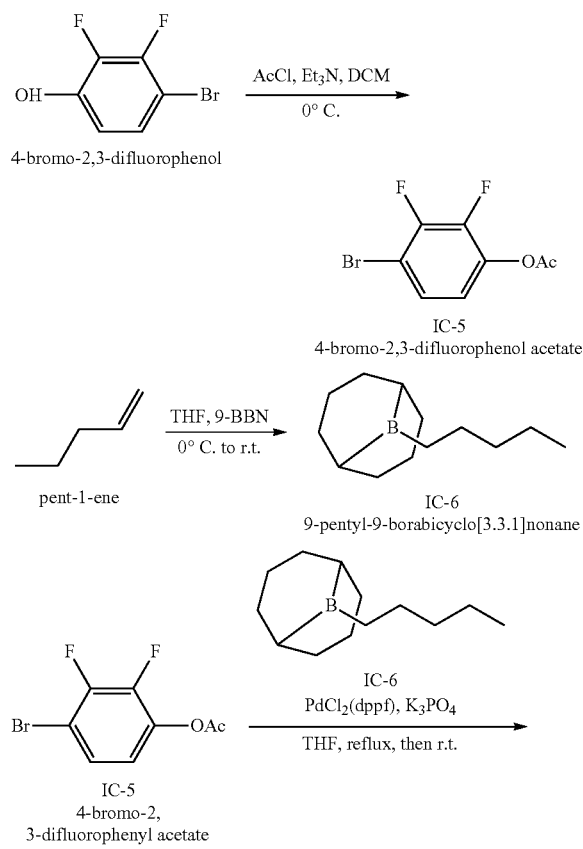

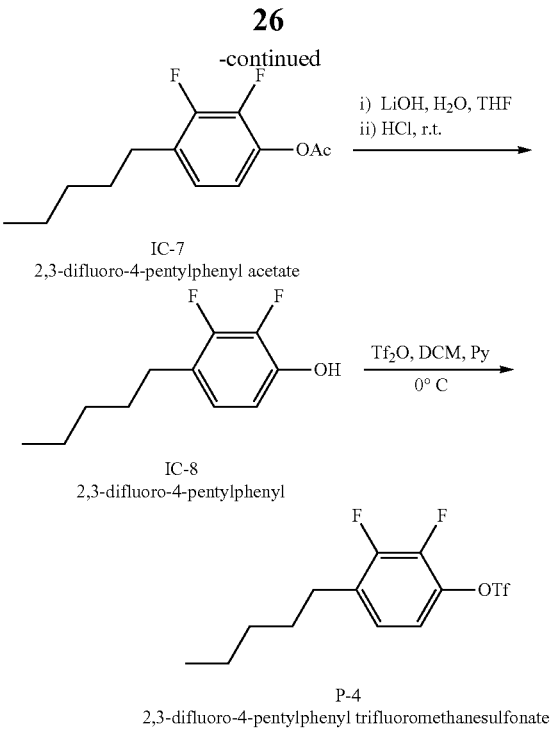

To a mixture of 4-bromo-2,3-difluorophenol (6.61 g, 31.65 mmol, Aldrich) and triethylamine ($Et_3N$) (6.331 g, 63.31 mmol, Aldrich) in dry dichloromethane (120 mL, Aldrich) was added acetyl chloride (3.37 g 47.5 mmol, Aldrich) slowly at 0° C. The resulting mixture was stirred for 1 hour and then poured into ice water. The resulting mixture was then extracted with diethyl ether (250 mL, Aldrich). The organic layer was separated and then dried over anhydrous $MgSO_4$ (Aldrich), and filtered to yield a solution of 4-bromo-2,3-difluorophenyl acetate (IC-5), which was directly used in the next step without further purification.

To a solution of 1-pentene (1.24 g, 17.68 mmol, Aldrich) in THF (8 mL, Aldrich) was added dropwise a solution of 9 borabicyclo[3,3,1]nonane (9-BBN) in THF (0.5 M, 35.36 mL, 17.68 mmol, Aldrich) at 0° C. The mixture was then gradually warmed to room temperature and stirred for another 4 hours to give a B-pentyl-9-BBN solution (IC-6), which was used in situ without further purification.

B-pentyl-9-BBN solution (IC-6), was added to a mixture of 4-bromo-2,3-difluorophenyl acetate (IC-5), (4.03 g, 16.08 mmol), $PdCl_2(dppf)$ (393 mg, 0.482 mmol, Aldrich), aqueous $K_3PO_4$ (3 N, 4.015 mL, 16.06 mmol, Aldrich) and THF (38 mL, Aldrich) at 0° C. The resulting mixture was stirred and refluxed at room temperature for 16 hours. After cooling to 0° C., $H_2O_2$ (30%, 6.43 mL, Aldrich) was added and the mixture was extracted with hexanes (Aldrich) and the hexane layer was washed with brine (Aldrich), dried over anhydrous $MgSO_4$ (Aldrich), filtered, and concentrated under reduced pressure to give a crude product of 2,3-difluoro-4-pentylphenyl acetate (IC-7).

2,3-Difluoro-4-pentylphenyl acetate (IC-7), (157 mg, 0.65 mmol) was added to a mixture of aqueous LiOH (1 M, 4 mL, Aldrich) and THF (30 mL, Aldrich). The resultant mixture was stirred at room temperature for 4 hours. The mixture was then neutralized with HCl (1M, Aldrich) and concentrated to provide 2,3-difluoro-4-phentyphenol (IC-8) as a crude product.

Triflic anhydride ((CF$_3$SO$_2$)$_2$O, or Tf$_2$O) (1.55 g, 5.5 mmol, Aldrich) was added to a mixture of 2,3-difluoro-4-phentyphenol (IC-8) (1 g, 5.00 mmol) and Pyridine (0.47 g, 6 mmol) in dichloromethane (150 mL) at 0° C. The resulting mixture was stirred at room temperature for 4 hours and then poured onto ice water, extracted with ethyl acetate (EtOAc) (Aldrich). The organic layer was washed with DI water, dried over anhydrous MgSO$_4$ (Aldrich), filtered, and concentrated under reduced pressure to give a crude product of 2,3-difluoro-4-pentylphenyl trifluoromethanesulfonate (P-4).

Example 2.1: Synthesis of 2,6-difluoro-4-((4-heptyl-2,6-dimethylphenyl)ethynyl)-benzonitrile (PAC-1

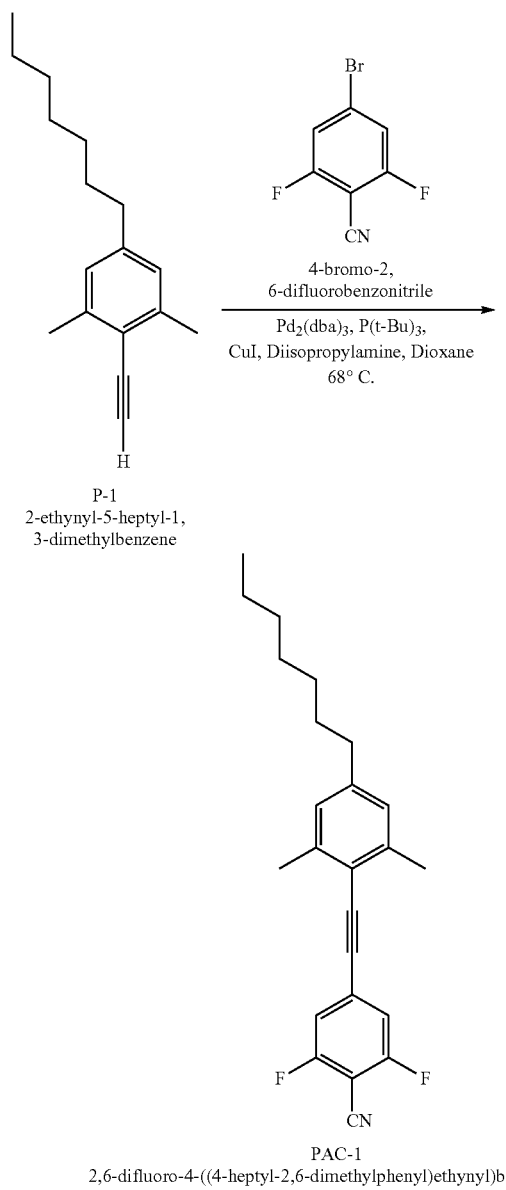

A mixture of Pd$_2$(dba)$_3$ (250 mg, 0.273 mmol, Aldrich) and CuI (250 mg, 1.32 mmol, Aldrich) was added to a solution of 1,4-dioxane (20 mL, Aldrich). After the mixture was degassed for 20 minutes, P(t-Bu)$_3$ was added (12 mL, 10% solution in hexanes, Aldrich), and degassed again for an additional 10 minutes. 2-Ethynyl-5-heptyl-1,3-dimethylbenzene (P-1) (4.0 g, 16.0 mmol) and 4-bromo-2,6-difluorobenzonitrile (2.98 g, 13.7 mmol, Aldrich) were then added to the reaction mixture followed by degassing for 10 minutes. Diisopropylamine (7.2 mL, Aldrich) was added to the reaction mixture and degassed for 20 minutes. The resulting mixture was then heated overnight at 68° C. under an argon atmosphere. After cooling, the mixture was then poured into a solution of THF (200 mL, Aldrich), the solids formed were filtered off, and washed with THF. The combined filtrates were concentrated and purified by flash column (silica gel, 5% to 30% ethyl acetate in hexanes gradient) to yield 2,6-difluoro-4-((4-heptyl-2,6-dimethylphenyl)-ethynyl)benzonitrile as Positive dielectric Anisotropy Compound 1 (PAC-1). $^1$H NMR (400 MHz, CDCl$_3$) δ 7.14-7.12 (m, 2H), 6.9 (s, 2H), 2.55 (t, J=7.7 Hz, 2H), 2.45 (s, 6H), 1.58-1.56 (m, 2H), 1.3-1.27 (m, 6H), 0.87 (t, J=7.68 Hz, 3H).

Example 2.2: Synthesis of 2,6-difluoro-4-((4-hexyl-2,6-dimethylphenyl)ethynyl)benzonitrile (PAC-2

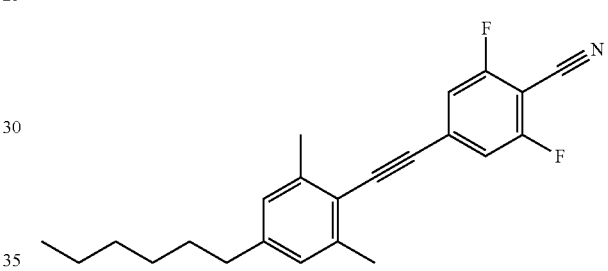

The synthetic procedure is substantially similar to the procedure described in Example 2.1 with the exception that 4-bromo-2-fluorobenzonitrile (Aldrich) instead of 4-bromo-2,6-difluorobenzonitrile was used as starting material. $^1$H NMR (400 MHz, CDCl$_3$) δ 7.57 (dd, J=6.6 Hz, 1.4 Hz, 1H), 7.36 ((dd, J=8.04 Hz, 1.4 Hz, 1H), 7.32 (dd, J=9.52 Hz, 1.08 Hz, 1H), 6.9 (s, 2H), 2.51 (t, J=7.7 Hz, 2H), 2.46 (s, 6H), 1.58-1.56 (m, 2H), 1.3-1.27 (m, 6H), 0.87 (t, J=7.68 Hz, 3H).

Examples 2.3: Synthesis of 2,6-difluoro-4-((4-pentyl-2,6-dimethylphenyl)ethynyl)-benzonitrile (PAC-3

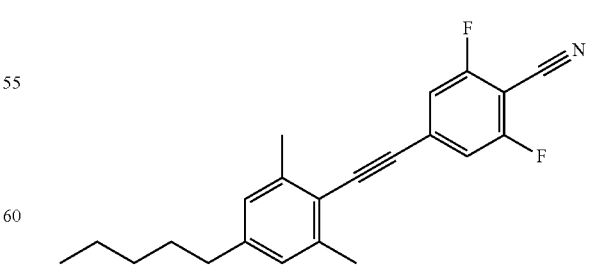

The synthesis procedure is substantially similar to the procedure described in Example 2.1 with the exception that 5-bromo-1,2,3-trifluorobenzene (Oakwood Chemical) instead of 4-bromo-2,6-difluorobenzonitrile was used as starting material. The result was 1,2,3-trifluoro-5-((4-heptyl-2,6-dimethylphenyl)ethynyl)benzene, or PAC-3. $^1$H NMR (400 MHz) CDCl$_3$) δ 7.11-7.10 (m, 2H), 6.88 (s, 2H), 2.54 (t, J=7.7 Hz, 2H), 2.44 (s, 6H), 1.5-1.2 (m, 10H), 0.87 (t, J=7.68 Hz, 3H).

Example 2.4: Synthesis of 2,6-difluoro-4-((4-(hexyloxy)-2,6-dimethylphenyl)ethynyl)-benzonitrile (PAC-4

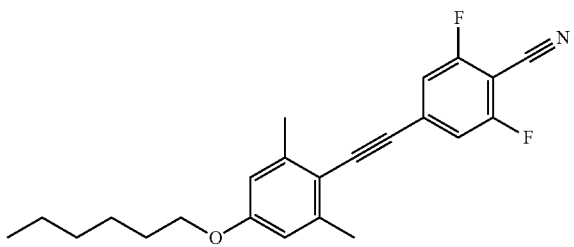 [SMILES: CCCCCCOc1cc(C)c(C#Cc2cc(F)c(C#N)c(F)c2)c(C)c1]

The synthetic procedure is substantially similar to the procedure described in Example 2.1 with the exception that P-3 instead of P-1 was used as starting material. $^1$H NMR (400 MHz) CDCl$_3$) δ 7.11 (d, J=7.68 Hz, 2H), 6.62 (s, 2H), 3.94 (t, J=6.58 Hz, 2H), 2.44 (s, 6H), 1.78-1.74 (m, 2H), 1.5-1.33 (m, 6H), 0.91 (t, J=7.68 Hz, 3H).

Example 2.5: Synthesis of 2,3-difluoro-4-((4-(hexyloxy)-2,6-dimethylphenyl)ethynyl)-benzonitrile (PAC-5

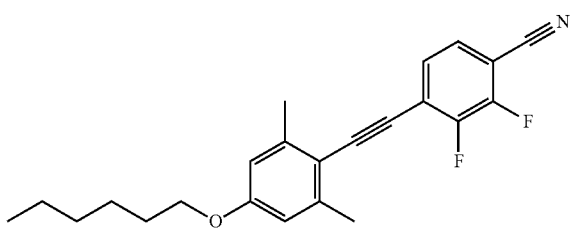 [SMILES: CCCCCCOc1cc(C)c(C#Cc2ccc(C#N)c(F)c2F)c(C)c1]

The procedure is substantially similar to the procedure described in Example 2.1 with the exception that P-3 instead of P-1 was used and that 4-bromo-2,3-difluorobenzonitrile (Oakwood Chemical) instead of 4-bromo-2,6-difluorobenzonitrile was used as starting material. The result was 2,3-difluoro-4-((4-(hexyloxy)-2,6-dimethylphenyl)ethynyl)benzonitrile, or PAC-5. $^1$H NMR (400 MHz, CDCl$_3$) δ 7.33-7.3 (m, 2H), 6.2 (s, 2H), 3.96 (t, J=6.58 Hz, 2H), 2.48 (s, 6H), 1.78-1.74 (m, 2H), 1.5-1.33 (m, 6H), 0.91 (t, J=7.68 Hz, 3H).

Example 2.6: Synthesis of 1,2,3-trifluoro-5-((4-(hexyloxy)-2,6-dimethylphenyl)ethynyl)-benzene (PAC-6

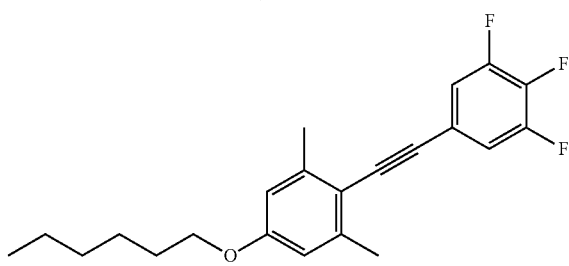 [SMILES: CCCCCCOc1cc(C)c(C#Cc2cc(F)c(F)c(F)c2)c(C)c1]

The synthetic procedure is substantially similar to the procedure described in Example 2.1 with the exception that P-3 instead of P-1, and 5-bromo-1,2,3-trifluorobenzene (Oakwood Chemical) instead of 4-bromo-2,6-difluorobenzonitrile were used as starting materials. $^1$H NMR (400 MHz) CDCl$_3$) δ 7.10-7.08 (m, 2H), 6.6 (s, 2H), 3.95 (t, J=6.58 Hz, 2H), 2.43 (s, 6H), 1.78-1.74 (m, 2H), 1.5-1.33 (m, 6H), 0.91 (t, J=7.68 Hz, 3H).

Comparative Example 2.1: Synthesis of 6-fluoro-4-((4-pentylphenyl)ethynyl)benzonitrile (CPAC-1

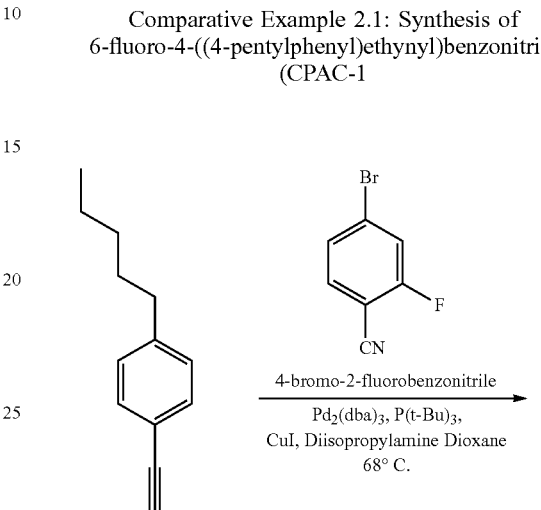

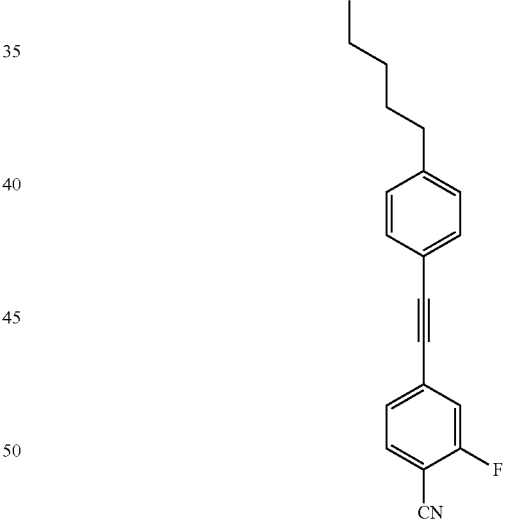

A mixture of Pd$_2$(dba)$_3$ (250 mg, 0.273 mmol, Aldrich) and CuI (250 mg, 1.32 mmol, Aldrich) was added to 1,4-dioxane (20 mL, Aldrich). The mixture was degassed for 20 minutes, then P(t-Bu)$_3$ was added (12 mL, 10% solution in hexanes, Aldrich) and the resulting mixture was degassed for an additional 10 minutes. 2-Ethynyl-5-pentylbenzene (P-2) (2.75 g, 16.0 mmol) and 4-bromo-2-fluorobenzonitrile (2.73 g, 13.7 mmol, Aldrich) were added to the reaction mixture followed by degassing for 10 minutes. Diisopropylamine (7.2 mL, Aldrich) was added to the reaction mixture followed by degassing for 20 minutes. The resulting mixture was then heated overnight at 68° C. under an argon atmosphere. After heating, the mixture was then cooled down and poured into THF (200 mL, Aldrich). The solids formed was filtered off, and washed with THF. The combined filtrates were then concentrated and purified by flash column (silica gel, 5% to 30% ethyl acetate in hexane as gradient) to yield 2-fluoro-4-((4-pentylphenyl)ethynyl)benzonitrile, as Comparative Positive dielectric Anisotropy Compound 1 (CPAC-1).

Example 2.7: Synthesis of 2,3-difluoro-1-((4-(hexyloxy)-2,6-dimethylphenyl)ethynyl)-4-pentylbenzene (NAC-1

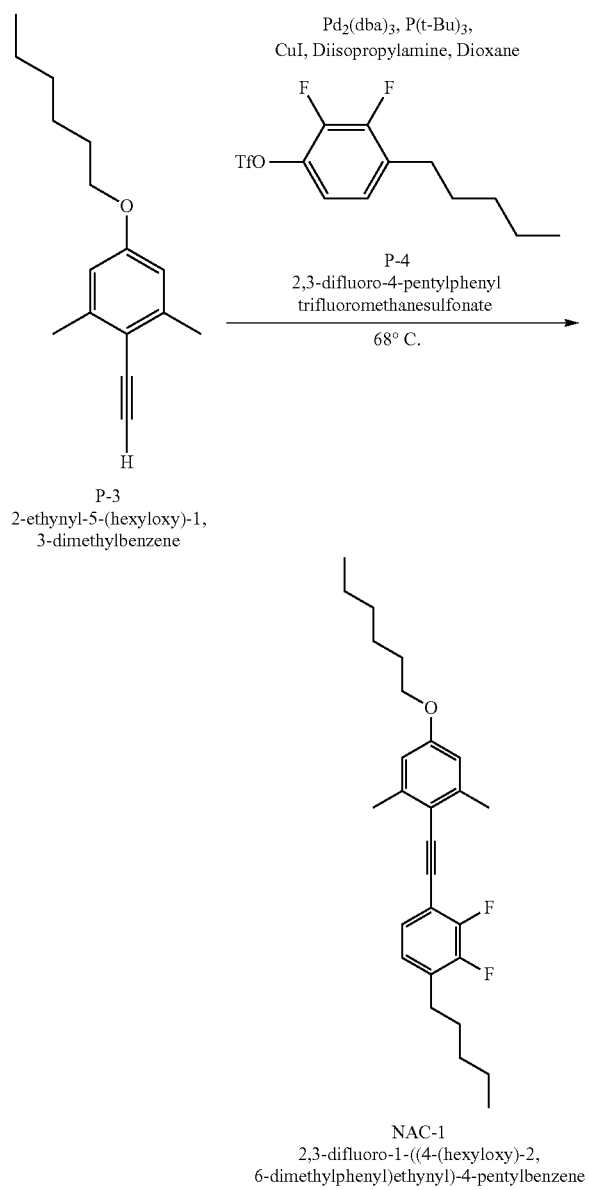

A mixture of CuI (336 mg, 1.76 mmol, Aldrich) and Pd$_2$(dba)$_3$ (336 mg, 0.584 mmol, Aldrich) was added to 1,4-dioxane (64 mL, Aldrich). The mixture was then degassed for 15 minutes. P(t-Bu)$_3$ in Toluene (1M, 2.3 mL, 2.3 mmol) was added to the mixture followed by 2-ethynyl-5-(hexyloxy)-1,3-dimethylbenzene (P-3) (3.10 g, 13.45 mmol) and 2,3-difluoro-4-pentylphenyl trifluoromethanesulfonate (P-4) (4.47 g, 13.45 mmol). The resulting mixture was degassed for 10 minutes. Diisopropylamine (7.2 mL, Aldrich) was added to the reaction mixture, and stirred under argon atmosphere at 68° C. for 16 hours. After cooling to room temperature, the mixture was diluted with diethyl ether (250 mL, Aldrich), and the solid formed was filtered off and washed with diethyl ether. The combined filtrates were then concentrated and purified by flash column (silica gel, 5% to 30% ethyl acetate in hexanes as gradient) and then recrystallized from hexanes to yield a colorless crystal of 2,3-difluoro-1-((4-(hexyloxy)-2,6-dimethylphenyl)ethynyl)-4-pentyl-benzene as Negative dielectric Anisotropy Compound 1 (NAC-1). $^1$H NMR (400 MHz) CDCl$_3$) δ 7.21-7.17 (m, 1H), 6.9-6.81 (m, 1H), 6.61 (s, 2H), 3.95 (t, J=6.58 Hz, 2H), 2.67 (t, J=7.7 Hz, 2H), 2.55 (s, 6H), 1.78-1.74 (m, 2H), 1.64-1.55 (m, 2H), 1.45-1.25 (m, 10H), 0.9-0.87 (m, 6H).

Example 3.1: Preparation of Liquid Crystal Mixtures

For the application of PDLC, liquid crystal system can take advantage of specific combinations of physical properties to improve functionality. One potentially important property is a wide nematic temperature range. The target nematic range of smart window film was −20° C. to +80° C. Historically, no single liquid crystal achieved such nematic range. Therefore a formulation composed of a number of liquid crystals may be used to achieve a wide nematic temperature range. For this purpose, a variety of liquid crystals with a low melting point were mixed with a number of liquid crystals with high melting points, good miscibility, and good solubility. In the present embodiments, the compounds were based on a biphenyl core. A number of cyanobiphenyl types of liquid crystals were formulated in the following manner.

In formulation 1 (F-1), 5CB (0.31 g, 54.7 wt %, Qingdao QY Liquid Crystal Co., Ltd., Chengyang, Qingdao, China), 7CB (0.13 g, 23.4 wt %, Qingdao QY Liquid Crystal), 8OCB (0.04 g, 7.3 wt %, Qingdao QY Liquid Crystal), 5CT (0.04 g, 7.5 wt %, Qingdao QY Liquid Crystal), and 2-fluoro-4-((4-heptylphenyl) ethynyl)benzonitrile (PAC-2) (0.04 g, 7.1 wt %) were mixed in a clear sample bottle, placed on a shaker (VWR Advanced Digital Shaker, Model-3500 ADV 120V), and shaken overnight to mix the liquid crystal compounds well. The sample bottle was then heated on a hot plate at 120° C. to dissolve any remaining components followed by gentle shaking by hand for one to two minutes until a clear solution appeared. The mixture was then kept on hot plate for another two minutes. The resulting clear solution was cooled to room temperature until it has a turbid liquid appearance, which is typical for liquid crystal formulation. A small amount (5-10 mg) of formulation-1 was taken out to measure differential scanning colorimetry (DSC) (TA Instrument, Model-Q2000). A single phase transition peak was observed at 47.3° C. Normally if the mixture is homogeneous then it should have a single phase transition temperature that is different from the individual melting temperature of each component. This single phase transition temperature is called eutectic temperature. The presence of a single phase transition confirmed a eutectic mixture.

The above process was repeated for additional formulations prepared in a similar way with the exception that the mass ratios of the constituents were varied as shown in Table 1. Their eutectic mixtures were confirmed by each having a single transition phase from Nematic to Isotropic.

TABLE 1

Mixture Formulations and Associated Phase Properties

| Formulation | 5CB (wt %) | 7CB (wt %) | 8OCB (wt %) | 5CT (wt %) | 5CCB (wt %) | 6CHBT (wt %) | Compound (wt %) | Nematic Range [° C.] |
|---|---|---|---|---|---|---|---|---|
| F-1 | 54.7 | 23.3 | 7.3 | 7.5 | 0.0 | 0.0 | PAC-2/7.1 | C −20 N 47.3 I |
| F-2 | 65.7 | 21.5 | 7.6 | 7.6 | 0.0 | 0.0 | PAC-1/6.5 | C −20 N 45.2 I |
| F-3 | 53.2 | 25.1 | 6.8 | 7.5 | 0.0 | 0.0 | PAC-6/7.3 | C −20 N 45.0 I |
| F-8 | 48.4 | 30.8 | 5.6 | 7.8 | 0.0 | 0.0 | PAC-5/7.3 | C −20 N 51.1 I |
| F-10 | 50.9 | 23.8 | 6.8 | 10.5 | 0.0 | 0.0 | PAC-4/7.9 | C −20 N 52.7 I |
| F-11 | 41.2 | 16.4 | 0.0 | 6.8 | 12.9 | 17.3 | PAC-6/5.4 | C −20 N 62.7 I |
| F-14 | 39.9 | 13.3 | 0.0 | 5.7 | 12.6 | 21.2 | PAC-1/7.3 | C −20 N 60.4 I |
| F-15 | 37.0 | 16.7 | 0.0 | 6.3 | 15.0 | 20.7 | PAC-5/4.3 | C −20 N 63.2 I |
| F-16 | 38.7 | 15.9 | 0.0 | 6.6 | 14.1 | 19.2 | PAC-2/5.5 | C −20 N 62.5 I |
| CF-1 (F-6) | 52.7 | 25.3 | 6.3 | 8.2 | 0.0 | 0.0 | CPAC-1/7.4 | C −20 N 51.6 I |
| CF-2 (F-12) | 40.6 | 15.3 | 0.0 | 6.1 | 14.5 | 18.7 | CPAC-1/4.8 | C −20 N 64.9 I |
| CF-3 (F-13) | 40.1 | 16.2 | 0.0 | 7.0 | 12.1 | 19.9 | CPAC-1/4.7 | C −20 N 63.3 I |
| Control-1 (E7) | 61.7 | 18.6 | 11.5 | 8.1 | 0.0 | 0.0 | — | C −20 N 56.1 I |
| E7 Reference | 51 | 25 | 16 | 8 | 0.0 | 0.0 | — | C −20 N 58.7 I |

Note 1:
LC compound 6CHBT was procured from Sigma Aldrich and LC compound 5CCB was procured from Qingdao QY Liquid Crystal Co., Ltd., Chengyang, Qingdao, China.
Note 2:
DSC Equipment was not run below −20° C.

Example 4.1: Composition Polarization

The synthesized compounds were examined with an optical microscope in a crossed polarization lighting condition to characterize their liquid crystal behavior and to study the composition's birefringence, or the difference between high and low refractive index of anisotropic liquid crystal molecules.

A microscope (BX-53F; Olympus, Tokyo, Japan) was setup for polarizing microscopy with the analyzer attachment (U-PA, Olympus) rotated 90 degrees from the polarizer filter (BX45-PO, Olympus) all within the optical path from an adjustable 100 watt halogen light attachment (U-LH100HG, Olympus). In addition, to capture the images the microscope was also equipped with a video camera adapter (U-TVO.35XC-2, Olympus) which was further connected to a computer for capturing the images. For measurement, the samples were placed on the microscope's stage placing it in the halogen lamp's optical path between the polarizer and the analyzer. Since the polarization occurs between the analyzer and polarizer which are oriented in 90 degrees with each other, if a sample is isotropic, e.g. glass, the light emitted from the source would be nearly completely blocked by the analyzer because the unblocked polarized light exiting the first polarizer would not bend and would be subsequently blocked by the analyzer. The blockage of the remaining light by the analyzer is due to the inability of isotropic materials to change the polarization direction of light passing through them. However, if an anisotropic sample is placed in between both polarizer films, the polarized light passing through the sample material can change polarization if the sample exhibits birefringence properties resulting in a light component not being blocked by the analyzer, or a detected interference pattern. Since glass is isotropic having minimal effect in light polarization, the liquid crystal compositions were sandwiched between two glass substrates during the measurements.

In addition to the microscope setup, a heating stage (FP 82 HT, Mettler Toledo, Columbus, Ohio, USA) and associated controller (FP 90, Mettler Toledo) was used to heat the samples sandwiched in glass to preset temperatures right before measurements were taken. The purpose was to determine the birefringence properties of the samples at specific temperatures in order to determine their phases as a function of temperature. If a sample was nematic or smectic then an interference pattern would be detected, but if the sample was isotropic the sample image would be black.

For the measurements, the liquid crystal composition PAC-1, made as described above was added to a solution of MLC-2142 (EMD Chemicals, Gibbstown, N.J., USA) with mass ratio of 8 wt %/92 wt % for PAC-1/MLC-2142. The mass ratio was chosen such that the relative mass ratio between MLC-2142 and a PAC compound was comparable to the ratio in a device. Starting at 40° C., an image was captured as a baseline of the mixture phase, FIG. 6A. Then, during first heating cycle the liquid crystal molecules in the sample were heated at a rate of 20° C. per minute until a black image was observed, FIG. 6C, which indicates a change to an isotropic phase, and the temperature was recorded. During cooling, when an interference color image was observed as a result of the sample transition back to nematic from isotropic, the phase transition temperature was re-verified and an image was recorded, FIG. 6B. Then, during second heating cycle, the samples were heating at a rate of 5° C. per minute in order to carefully record the phase change temperature. For the PAC-1 mixture, the phase change temperature was 89° C.

For compounds PAC-4, PAC-5, PAC-8 and CPAC-1, the procedure for preparation of mixtures with MLC-2142 was similar to that for PAC-1 with the exception that the respective compound was used as depicted in Table 2. In addition, a control with only MLC-2142 as the liquid crystal compound was also measured in a procedure similar to that of PAC-1.

For the mixtures, their transition temperatures are depicted in Table 2. If a nematic phase was present after cooling and the samples exhibited birefringence, it was detected as transformed component light at the microscope or an interference pattern. If the material was in an isotropic phase, it was observed by detecting no discernible light at the microscope. All mixtures prepared appeared to have nematic phases at 40° C. and all had transition temperatures to isotropic between 80° C. to 95° C.

TABLE 2

Observed Transition Temperatures for Various Compounds.

| Composition | Additional Compounds | Corresponding FIG. Showing Nematic Phase at 40° C. | Corresponding FIG. Near Transition Temp | Isotropic Phase Transition Temp [° C.] | Corresponding FIG. Near Transition Temp |
|---|---|---|---|---|---|
| PAC-1 (8 wt %) | MLC-2142 (92 wt %) | FIG. 6A | FIG. 6B | 89 | FIG. 6C |
| PAC-4 (8 wt %) | MLC-2142 (92 wt %) | FIG. 7A | FIG. 7B | 88 | FIG. 7C |
| PAC-5 (8 wt %) | MLC-2142 (92 wt %) | FIG. 8A | FIG. 8B | 90 | FIG. 8C |
| CPAC-1 (8 wt %) | MLC-2142 (92 wt %) | FIG. 9A | FIG. 9B | 86 | FIG. 9C |
| — | MLC-2142 (100 wt %) | FIG. 10A | FIG. 10B | 95 | FIG. 10C |

Note:
The polarized microscope images were taken at 40° C. which is thought to be close enough to room temperature. The mixtures were formulated so that they had a comparable relative liquid crystal mass ratio with the following target mixture as in some of devices described below: composition (7 wt %), MLC-2142 (83 wt %), LC-242 (9.9 wt %), and Irgacure 907 (0.1 wt %).

Example 5.1: Fabrication of Positive Dielectric Anisotropy LC-Based Dimmable Device Using the Layer Method A selectively dimmable device based on a liquid crystal compound with positive dielectric anisotropy can be fabricated using the layer method.

In the layer method, first ITO glass substrates (75 mm×25 mm; Murakami Glass, Japan, Part SIO100N, 100 ohm) can be purchased directly instead of fabricating an electron conduction layer on the glass to yield a conductive substrate. The ITO glass can be cleaned by sonicating with isopropyl alcohol (IPA) and acetone for about 20 minutes followed by pretreating it by baking at 200° C. for 30 minutes in an oven. After pre-treating, an alignment layer comprising SE-150 (Nissan Chemical Industries, Ltd., Tokyo, Japan) can be applied to one side of each piece of ITO glass by spin coating. The spin coater (1H-D7, Mikasa Co. Ltd., Tokyo, Japan) is run at 300 rpm for 10 seconds and then at 2,000 rpm for 10 seconds to provide the desired thickness of the alignment layer. Then, alignment layer can be cured. The curing is done by first soft baking the substrates at 80° C. for 5 minutes on a hot plate. Next, the substrates are hard baked in an oven at 250° C. for 30 minutes to cure the polyimide alignment layer. This process can result in alignment layered substrates. The desired thickness of the polyimide layer is about 80 nm.

The above alignment layered substrates can then be aligned by mechanical rubbing by rubbing with a rayon cloth (YA-18-R; Yoshikawa Chemical Company, Ltd., Osaka, Japan) wrapped on a stainless steel roller (2 cm dia., 20 cm len., 1 kg wt.) to give a rubbed substrate. The rubbing can be done by placing the cloth encapsulated roller on the substrate and buffing on the substrate in one direction about 30 times. After rubbing, the alignment layered substrates in one direction is to ensure that the substrates are aligned when sandwiched.

A liquid crystal formulation was prepared by first mixing the compounds PAC-1 and MLC-2142 (EMD Chemicals) with 10 wt % and 80 wt % respectively using an ultrasonic homogenizer to mix the compounds at a temperature above each of the chemicals' clearing point, or about 100° C. to result in a first mixture. Separately, the polymer precursors of 10 wt % of reactive mesogen LC-242 (50 vol % THF; BASF) and 1 wt % of photo initiator Irgacure 907 (BASF) as well as THF (Aldrich) were mixed in a vortex mixer to result in a second mixture. The second mixture was then slowly added to the clear phase of the first mixture, and all components were mixed well with an ultrasonic homogenizer for about 5 minutes to thoroughly mix the liquid crystals and polymer precursors as well as THF. Next, approximately 2 mg of spacer beads (10 μm avg. dia.; Sekisui Chemical Co., Ltd., Minakuchi, Japan) was added to the resulting mixture that was stirred again. A small sample was examined to confirm no aggregate formation of spacers. This process results in a coating formulation.

Next, the rubbed substrates are then pretreated for liquid crystal layering by soft baking the substrates at 80° C. for 5 minutes on a hot plate. Then, the coating formulation can be spin coated onto the substrates, the spin coating machine operating at a rate of 300 rpm for 10 seconds to provide the desired thickness of the liquid crystal layer. The resulting coated substrates can be soft baked at 80° C. for 5 minutes on a hot plate to remove any residual solvent. After soft baking, the layers on each substrate are pressed together in opposite directions, resulting in a dimmable assembly. For the testing purpose, the assembly is sandwiched such that two of the opposing sides of the liquid crystal layers are offset about 5 mm from each length side to allow for connecting a laboratory electrical connection.

The above dimmable assembly can be placed in a clear plastic bag and then sealed under vacuum for 5 minutes. Additionally, the sandwiched sample can be further pressed with two glass plates to facilitate bonding. After removing from the vacuum, the assembly can be cured under a UV flood lamp (7411 UV Flood System; Loctite, Rocky Hill, Conn. USA) at an output of about 10 mW/cm² incident power for 5 minutes on each side to photopolymerize the LC-242. The sample may be switched on sides at roughly 3-minute intervals to keep the temperatures of the assembly from blooming due to the absorption of UV radiation.

After UV-curing, the edges can be sealed with a sealant to protect the liquid crystal element. After encapsulation, the assembly can then be baked in an oven at 80° C. for 30 minutes to yield a dimmable assembly.

Both substrates in the above dimmable assembly can be electrically connected by clamping a conducting clamp and wire in electrical communication such that each conductive substrate can be in electrical communication with a voltage source, where the communication is such that when the voltage source is applied an electric field can be generated across the device. The voltage source can provide the necessary voltage across the device to cause the index of refraction to mismatch in the liquid crystal element resulting in a dimmable device, DD-1. The detail of the DD-1 is described in Table 3 below.

TABLE 3

Variances between the Fabricated Dimmable Elements.

| Device | Example | Liquid Crystal | Polymer | Polyimide | Dielectric Anisotropy | Process |
|---|---|---|---|---|---|---|
| DD-1 | Example 5.1 | PAC-1 (89.9 wt %) | LC-242 (9.9 wt %) Igracure 907 (0.1 wt %) | SE-150 | Positive | Layer |
| DD-2 | Example 5.2 | NAC-1 (89.9 wt %) | LC-242 (9.9 wt %) Igracure 907 (0.1 wt %) | SE-5661 | Negative | Layer |
| DD-3 | Example 5.3 | PAC-1 (89.9 wt %) | LC-242 (9.9 wt %) Igracure 907 (0.1 wt %) | SE-150 | Positive | Capillary |
| DD-4 | Example 5.4 | NAC-1 (89.9 wt %) | LC-242 (9.9 wt %) Igracure 907 (0.1 wt %) | SE-5661 | Negative | Capillary |
| DD-5 | Example 5.5 | PAC-4 (10.1 wt %) MLC-2142 (80.9 wt %) | LC-242 (8.9 wt %) Igracure 907 (0.1 wt %) | SE-150 | Positive | Layer |
| DD-6 | Example 5.6 | PAC-2 (8.0 wt %) MLC-2142 (83.0 wt %) | LC-242 (8.9 wt %) Igracure 907 (0.1 wt %) | SE-150 | Positive | Layer |
| DD-7 | Example 5.7 | PAC-5 (5.7 wt %) MLC-2142 (87.4 wt %) | LC-242 (6.8 wt %) Igracure 907 (0.06 wt %) | SE-150 | Positive | Layer |
| DD-8 | Example 5.8 | F-1 (92.7 wt %) | LC-242 (6.9 wt %) Igracure 651 (0.4 wt %) | LX-1400 | Positive | Capillary |
| DD-9 | Example 5.9 | F-2 (92.6 wt %) | LC-242 (7.1 wt %) Igracure 651 (0.3 wt %) | LX-1400 | Positive | Capillary |
| DD-10 | Example 5.9 | F-3 (92.9 wt %) | LC-242 (6.5 wt %) Igracure 651 (0.6 wt %) | LX-1400 | Positive | Capillary |
| DD-11 | Example 5.9 | F-8 (93.8 wt %) | LC-242 (5.9 wt %) Igracure 651 (0.3 wt %) | LX-1400 | Positive | Capillary |
| DD-12 | Example 5.9 | F-10 (93.4 wt %) | LC-242 (6.2 wt %) Igracure 651 (0.4 wt %) | LX-1400 | Positive | Capillary |
| DD-13 | Example 5.9 | F-11 (92.8 wt %) | LC-242 (6.8 wt %) Igracure 651 (0.4 wt %) | LX-1400 | Positive | Capillary |
| DD-14 | Example 5.9 | F-14 (90.4 wt %) | LC-242 (9.0 wt %) Igracure 651 (0.6 wt %) | LX-1400 | Positive | Capillary |
| DD-15 | Example 5.9 | F-15 (87.9 wt %) | LC-242 (11.5 wt %) Igracure 651 (0.6 wt %) | LX-1400 | Positive | Capillary |
| CDD-1 | Comp. Ex. 5.1 | MLC-2142 (82 wt %) | LC-242 (9.9 wt %) Igracure 907 (0.1 wt %) | SE-150 | Positive | Layer |
| CDD-2 | Comp. Ex. 5.2 | CPAC-1 (9.3 wt %) MLC-2142 (74.3 wt %) | LC-242 (8.9 wt %) Igracure 907 (0.1 wt %) | SE-150 | Positive | Layer |
| CDD-3 | Comp. Ex. 5.3 | CPAC-1 (7.9 wt %) MLC-2142 (75.4 wt %) | LC-242 (9.1 wt %) Igracure 907 (0.1 wt %) | SE-150 | Positive | Layer |
| CDD-4 | Comp. Ex. 5.4 | CF-1 (F-6) (93.1 wt %) | LC-242 (6.2 wt %) Igracure 651 (0.7 wt %) | LX-1400 | Positive | Capillary |
| CDD-5 | Comp. Ex. 5.4 | CF-2 (F-12) (90.6 wt %) | LC-242 (8.8 wt %) Igracure 651 (0.6 wt %) | LX-1400 | Positive | Capillary |
| CDD-6 | Comp. Ex. 5.4 | CF-3 (F-13) (89.2 wt %) | LC-242 (10.1 wt %) Igracure 651 (0.7 wt %) | LX-1400 | Positive | Capillary |
| CDD-7 | Comp. Ex. 5.4 | Control-1 (93.8 wt %) | LC-242 (5.2 wt %) Igracure 651 (1.0 wt %) | LX-1400 | Positive | Capillary |
| CDD-8 | Comp. Ex. 5.4 | Comm. E7 (93.8 wt %) | LC-242 (5.2 wt %) Igracure 651 (1.0 wt %) | LX-1400 | Positive | Capillary |

Note:
CDD-3, DD-5, DD-7, and DD-8 were the same form factor and CDD-1 and CDD-2 were a different form factor.

Example 5.2: Fabrication of Negative Dielectric Anisotropy LC-Based Dimmable Device Using the Layer Method A selectively dimmable device based on a liquid crystal compound with negative dielectric anisotropy can be fabricated using the layer method. The method is the same as that described in Example 5.1, with the exception that a negative dielectric anisotropic liquid crystal composition is used in lieu of compound PAC-1, and for the alignment layer, SE-5661 (Nissan Chemical Industries, Ltd.) can be used instead of SE-150 to generate a dimmable device, DD-2.

Example 5.3: Fabrication of Positive Dielectric Anisotropy LC-Based Dimmable Device Using the Capillary Method A selectively dimmable device based on a liquid crystal compound with positive dielectric anisotropy can be fabricated using the capillary method.

For the capillary method, first ITO glass (Aldrich) was purchased directly instead of fabricating an electron conduction layer on the glass to yield a conductive substrate. If necessary the ITO glass can be cleaned by sonicating with IPA and acetone for about 20 minutes. The cleaned ITO glass can then be pretreated by baking at 200° C. for 30 minutes in an oven. After pre-treating, an alignment layer comprising SE-150 (Nissan Chemical Industries) can be applied to one side of each piece of ITO glass by spin coating. The spin coater (1H-D7, Mikasa) is run at 300 rpm for 10 seconds and then at 2,000 rpm for 10 seconds to provide the desired thickness of the alignment layer. Then, alignment layer can be cured. The curing is done by first soft baking the substrates at 80° C. for 5 minutes on a hot plate. Next, the substrates are hard baked in an oven at 200° C. for 30 minutes. This process can result in alignment layered substrates.

The above alignment layered substrates can then be aligned by mechanical rubbing by rubbing with a rayon cloth (YA-18-R; Yoshikawa Chemical Company, Ltd, Osaka, Japan) to give a rubbed substrate. The rubbing can be done by rolling the cloth at rate of 1,000 rpm, with the substrates passing at a translational rate of 0.5 mm/s and rubbing in one direction to ensure that the plates were well aligned.

Next, spacer beads (Sekisui Chemical) can be applied to the alignment layer surface of the rubbed substrates. Then, the edges of the substrates were lined with NOA-61, a resin, leaving a space at two opposite edges to allow air to escape once the plates are joined. Next, the two plates are then joined with the alignment layers facing inward such that they create an air gap bounded by the resin on the edges except where there are air gaps and then pushed along to alignment axis such that the substrates are ajar to support capillary filling of the air gap. The resulting assembly can then be vacuum sealed to ensure a uniform thickness for 5 minutes.

The above assembly can then be cured under a UV flood lamp (Loctite) for 6 minutes at 3-minute intervals to keep the temperature low. Once cured, a coating mixture of compound PAC-1, polymer precursors LC-242 (BASF), Irgacure 907 (BASF), and THF (Aldrich) prepared similarly as that described above, can then be injected into the gap by capillary action, until the gap is filled with the coating mixture.

Once filled, the above assembly can then be cured under a UV flood lamp (Loctite) for 6 minutes at 3-minute intervals.

After UV-curing, the edges can be sealed with a sealant to protect the liquid crystal element. After encapsulation, the assembly can then be baked in an oven at 80° C. for 30 minutes, which can result in a dimmable assembly.

Both substrates of the above dimmable assembly can be electrically connected by clamping a conducting clamp and wire in electrical communication such that each conductive substrate can be in electrical communication with a voltage source, where the communication is such that when the voltage source is applied an electric field can be generated across the device. The voltage source can provide the necessary voltage across the device to cause the index of refraction to mismatch in the liquid crystal element. This process can result in a dimmable device, DD-3.

Example 5.4: Fabrication of Negative Dielectric Anisotropy LC-Based Dimmable Device Using the Capillary Method A selectively dimmable device based on a liquid crystal compound with negative dielectric anisotropy can be fabricated. The same method as that described in Example 5.3 can be used, with the exception that a negative dielectric anisotropic liquid crystal composition, NAC-1, can be used in lieu of PAC-1, and for the alignment layer, SE-5661 can be used instead of SE-150 to give a dimmable device, DD-4.

Examples 5.5, 5.6, and 5.7: Fabrication of Positive Dielectric Anisotropy LC-Based Dimmable Devices Using the Layer Method In Example 5.5, a selectively dimmable device was fabricated by using substantially the same method as that outlined in Example 5.1, with the exception that PAC-4 was used instead of PAC-1, and the other differences outlined in Table 3. A dimmable device, DD-5 was obtained.

In Example 5.6, a selectively dimmable device was fabricated by using substantially the same method as the one outlined in Example 5.1, with the exception that PAC-6 was used instead of PAC-1, and the other differences outlined in Table 3. A dimmable device, DD-6 was obtained.

In Example 5.7, a selectively dimmable device was fabricated by using substantially the same method as the one outlined in Example 5.1, with the exception that PAC-8 was used instead of PAC-1, and the other differences outlined in Table 3. A dimmable device, DD-7 was obtained.

Example 5.8: Fabrication of Mixture Based Dimmable Device Using the Capillary Method A selectively dimmable device was fabricated using the capillary method. A homogeneous-type liquid crystal test cell (KSRO-10/B107M1NSS05, E.H.C Co. Ltd, Tokyo, Japan) was used for making the device. The test cell comprised two substrates with supports that define an active alignment area between the two substrates. The size of the glass/ITO substrate was 20 mm×25 mm with a sheet resistance about 100 Ω/sq, and the active alignment area was about 10 mm×10 mm with a cell gap of 10 um. The cell was pre-coated with a polyamide alignment layer (LX-1400, Hitachi-Kasei Shoji Co., Ltd., Tokyo, Japan) so that no additional application of alignment layers was necessary. In addition, since the geometry of the cell included supports to ensure preservation of the cell gap, additional separate spacers were not required to be inserted into the cell before application of a liquid crystal mixture.

First, the test cell was baked at 150° C. for 30 minutes before injecting a liquid crystal mixture into the test cell in order to remove any impurities and any vapors inside the crystal chamber. Next, the polymer precursors, reactive mesogen, LC-242 (BASF Corporation, Florham Park, N.J., USA) and photo initiator, Irgacure 651 (BASF) were respectively dissolved in 50 vol % THF (Aldrich), and mixed (using a vortex mixer) in a mass ratio of corresponding to 10 wt % to 1 wt % of the liquid crystal mixture in formulation F-1 (as described in Table 1) to create a precursor mixture. Then, this precursor mixture was slowly added to the liquid crystal mixture (F-1) at 100° C. The resulting liquid crystal composition was then mixed thoroughly using an ultrasonic homogenizer under vacuum, and the excess THF was removed at same time to yield a hot coating formulation.

Next, the test cell was pretreated for the liquid crystal injection by warming the substrates at 80° C. for 5 minutes on a hot plate. Then, the above hot coating formulation was injected near the opening of the test cell. The solution was then allowed to enter into the test cell by capillary action until the entire active alignment area was coated. In some embodiments, the test cell was put on hot plate after injecting coating formulation to help ensure homogenous coverage of the liquid crystal. The resulting coated substrates were then soft baked at 80° C. for 3 minutes on a hot plate to remove any residual solvent. After soft baking, the resulting layered cell assembly was ready for ultraviolet (UV) radiation curing (UV-curing).

The above layered cell assembly was then put on a stainless steel plate to provide a thermal sink so that the cell did not overheat during UV-curing. The assembly was then cured under a UV LED (365 nm, Larsen Electronics, Kemp, Tex. USA) at an output of about 50 mW/cm$^2$ of incident power for about 1 minute on each side to photo polymerize the LC-242. To keep the assembly away from any localized blooming caused by the increased temperature—due to the UV irradiation, the orientation of the sample was switched at approximately 1-minute intervals by flipping the assembly over. This process resulted in an unsealed, dimmable assembly.

After UV-curing, the edges were optionally sealed with a sealant to protect the liquid crystal element. After encapsulation, the assembly can then be baked in an oven at 80° C. for 30 minutes to provide a sealed, dimmable assembly.

Finally, the dimmable assembly was placed in electrical communication with a voltage source by electrically attaching a conducting clamp and wire in electrical communication with a voltage source to each conductive substrate such that when a voltage is applied from the voltage source, an electrical field is generated across the liquid crystal composition. A selectively dimmable device, DD-8 was obtained.

Example 5.9 Fabrication of Additional Mixture-Based Dimmable Devices Using the Capillary Method A number of additional devices (DD9, DD10, DD11, DD12, DD13, DD14, and DD15) were made using the same procedure as described in Example 5.8 with the exception that the formulations of mixtures were varied as shown in Table 3.

Comparative Example 5.1: Fabrication of a Comparative Positive Dielectric Anisotropy LC-Based Dimmable Device Using the Layer Method In Comparative Example 5.1, a selectively dimmable device based on a liquid crystal compound with positive dielectric anisotropy was fabricated similar to the method used in Example 5.1, with the exception that a commercially available liquid crystal mixture, MLC-2142 (Merck), instead of PAC-1, was used and the other differences outlined in Table 3. A comparative dimmable device, CDD-1 was obtained.

Comparative Examples 5.2 and 5.3: Fabrication of a Comparative Positive Dielectric Anisotropy LC-Based Dimmable Devices Using the Layer Method In Comparative Example 5.2, a selectively dimmable device based on a liquid crystal compound with positive dielectric anisotropy was fabricated similar to the method used in the above Comparative Example 5.1 with the exception that a commercially available liquid crystal MLC-2142 (Merck), instead of PAC-1, was used in conjunction with CPAC-1 at a mass ratio of about 8:1 in addition to the other differences outlined in Table 3. A comparative dimmable device, CDD-2 was obtained.

In Comparative Example 5.3, a selectively dimmable device based on a liquid crystal compound with positive dielectric anisotropy was fabricated similar to the method used in the above Comparative Example 5.2 with the exception that a device with a larger aperture was developed to have the same form factor as the non-comparative dimmable devices. A comparative dimmable device, CDD-3 was obtained.

Comparative Example 5.4: Fabrication of Comparative Mixture-Based Dimmable Devices Using the Capillary Method A number of Comparative mixture-based devices were made using the same procedure as described in Example 5.8 with the exception that both mixtures and formulations were varied as shown in Table 3.

Example 6.1: Optical Measurements

The optical characteristics of the fabricated dimmable devices were characterized by measuring the light allowed to pass through with and without an electric field present. Light transmittance for the samples was measured using a haze meter (HM-150; Murakami Color Research Laboratory, Tokyo, Japan) with each respective sample placed inside the device. The source was first directly measured without any sample present to provide a baseline measurement of total light transmitted. Then, a sample was placed directly in the optical path, such that the emitted light passes through the sample. Then the sample was connected to a voltage source (3PN117C Variable Transformer; Superior Electric, Farmington, Conn., USA) via electrical wires, one wire connected to each terminal and to a respective ITO glass substrate on the device such that an electric field would be applied across the device when a voltage source is energized or a voltage applied, and placed into the haze meter. Then, the emitted light transmitted through the samples was measured, at first with no voltage applied and then at various magnitudes of voltage, ranging from 0 volts to an upper voltage, depending on the behavior of the sample ranging from 12 volts to a maximum of 50 volts; with haze measurements taken at the different voltage levels.

Figure 11:
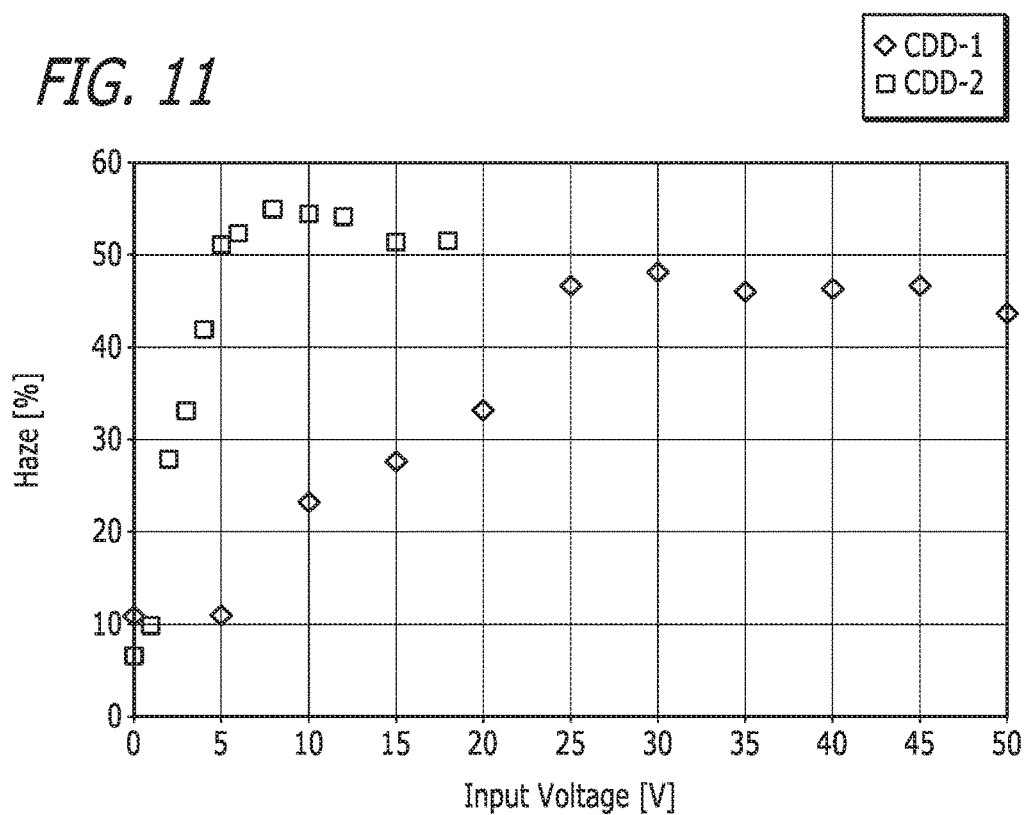
FIG. 11 is a plot of input voltage versus haze (%) showing results for comparable dimmable device CDD-1 and comparative dimmable device CDD-2.
Figure 12:
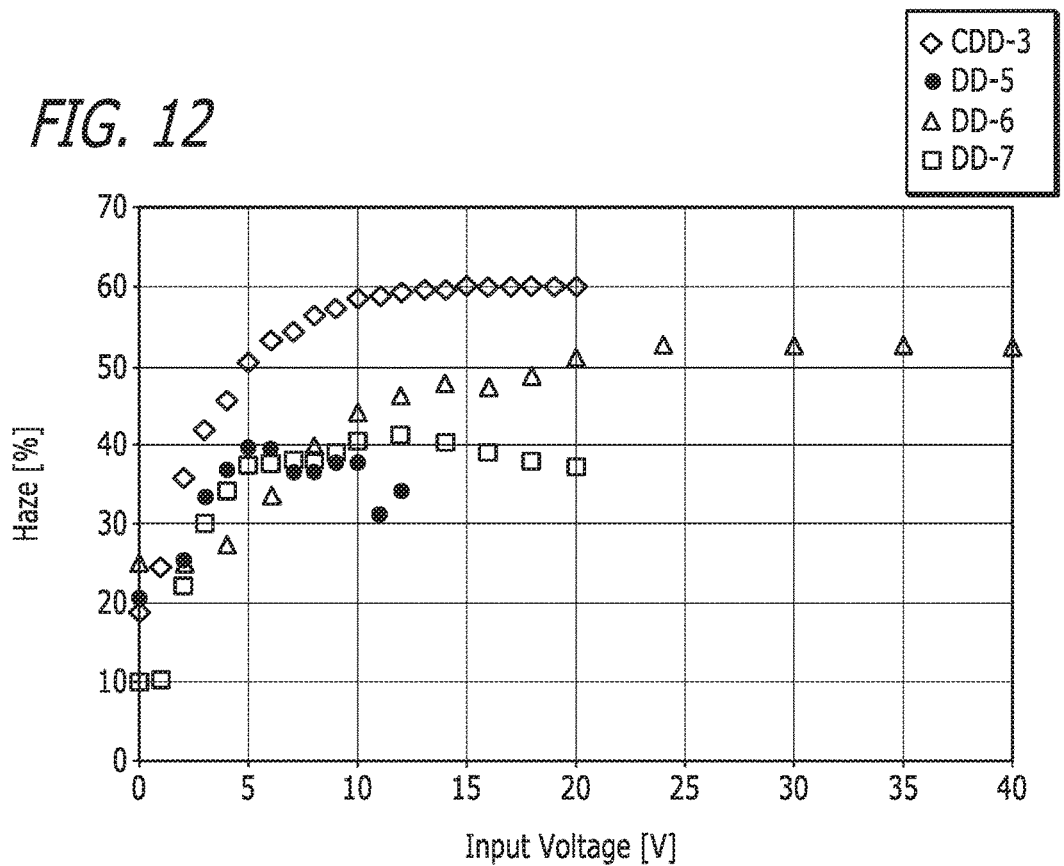
FIG. 12 is a plot of input voltage versus haze (%) showing results for dimmable devices DD5 thru DD7 and comparable dimmable device CDD-3.
Figure 13:
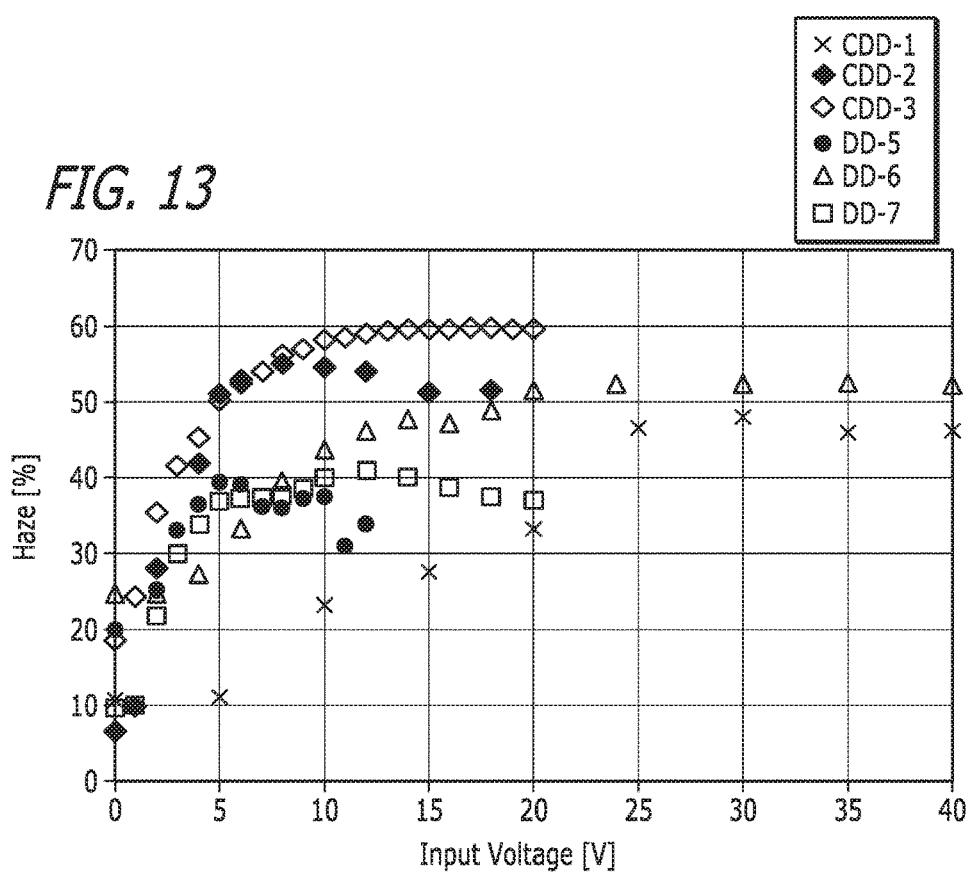
FIG. 13 is a plot of input voltage versus haze (%) showing results for dimmable devices DD5 thru DD7 and CDD-1 thru CDD-3.

The results of the measurements are shown in FIGS. 11, 12, 13, 14, and 15. FIG. 11 shows the device comparison between CDD-1 (MLC-2142) and CDD-2 (80 wt % MLC- 2142 with 10 wt % CPAC) in a smaller square form factor. It was seen that the addition of CPAC clearly (CDD-2) provides increased device performance by enabling lower voltages to activate the dimmable device. FIG. 12 shows the comparison between all MLC-2142-based formulation window elements in the same larger form factor. As shown in FIG. 12, although not reaching the same active haze level as CDD-3, DD-5, DD-6 and DD-7 provide full switching at about the same or lower voltages than the CPAC-based element (CDD-2), ranging from 5 volts to 10 volts to switch. In addition, as shown in FIG. 13, the aforementioned elements of MLC-2142 with CPAC (in CDD-2, CDD-3, DD-5, DD-6 and DD-7) also appeared to perform better than the element with MLC-2142 alone (CDD-1), even when factoring in the differences between CDD-2 and CDD-3 as an indicator of sensitivity of haze due to size changes.

Figure 14:
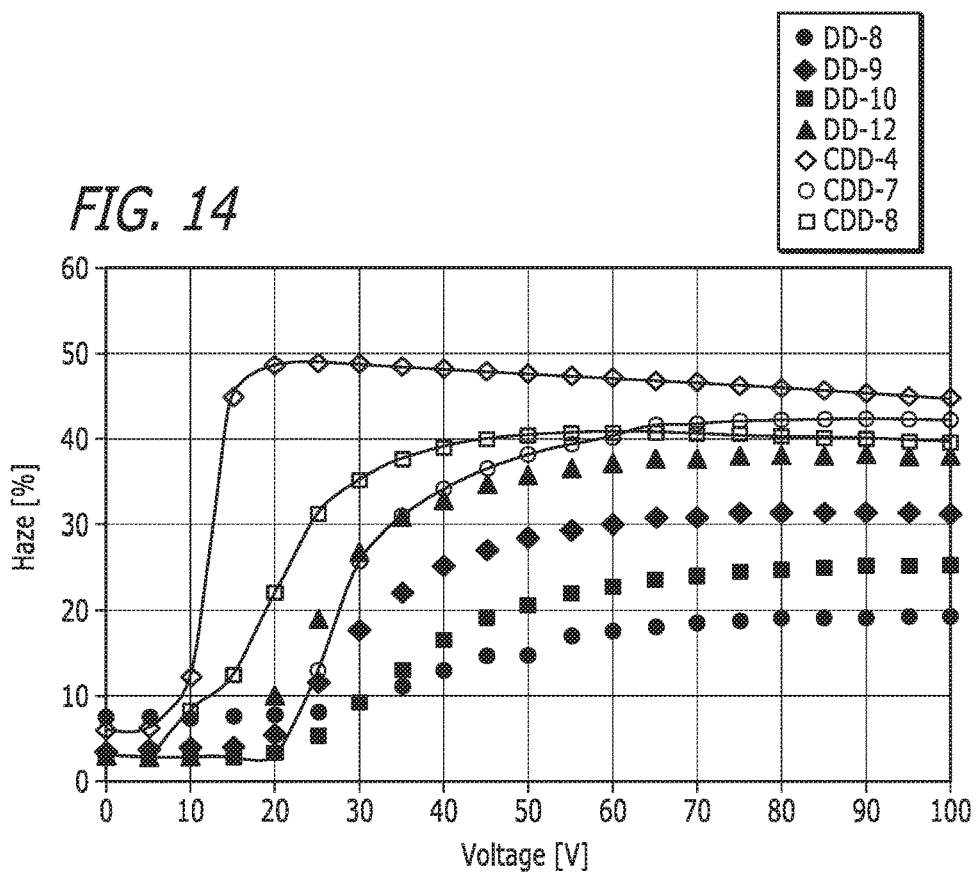
FIG. 14 is a plot of input voltage versus haze (%) showing results for dimmable devices created with mixture formulations (DD-8 thru DD-10, DD-12, CDD-4, CDD-7, and CDD-8).

For the first set of mixture based devices, DD-8 thru DD-12, the results are shown in FIG. 14. It was observed that the change in haze appeared to be lower for the mixture embodiments (containing PAC compounds) in DD8 through DD-12 than for the E7 based mixtures (containing CPAC compounds) in CDD-4 thru CDD-6.

Figure 15:
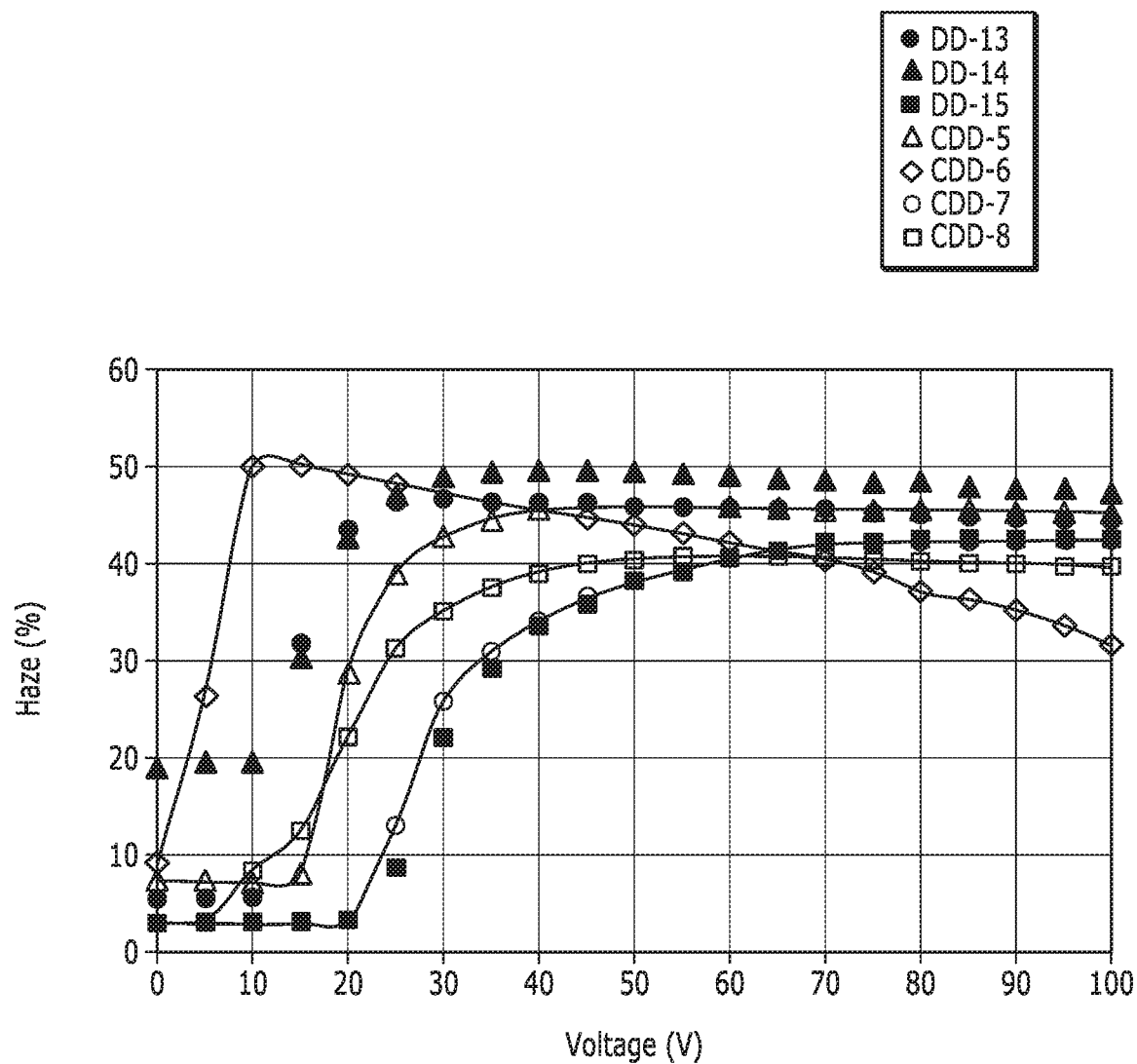
FIG. 15 is a plot of input voltage versus haze (%) showing results for dimmable devices created with a second set of mixture formulations (DD-13 thru DD-15, CDD-5 thru CDD-8).

For the second set of mixture based devices, DD-13 thru DD-15, the results are shown in FIG. 15. It was observed that these devices, which were formulated differently to have a broader nematic range, had a better performance as compared to the first set of devices (DD-8 thru DD-12). At voltages 20 volts or above, device DD-13, using PAC-6, achieved the best haze change performance, slightly better than the CPAC-1 based analogues (CDD-5) of which one (CDD-6) showed signs of degradation at higher voltages. Overall, at voltages above 30 volts, device DD-14 had the highest on-state haze, albeit with a higher off-state haze. On the other hand, DD-13 had the similar high change (only slightly lower) in haze as that of DD-14, at low voltages between 0-5 volts, device DD-13 had desired very low haze level, significantly lower than that of DD-14.

Example 6.1 Ultraviolet Endurance Measurements

For the mixtures, selected formulations were irradiated by a UV source to measure the stability of the compounds. For each sample, a small amount was placed in between two glass slides (Thin Film Devices, Inc. Anaheim Calif. USA) to make a thin film and the Yellowness Index (YI) was measured with a spectrophotometer (Ultrascan Pro, Hunter Associates Laboratory, Inc., Reston Va. USA) to determine the initial YI of the sample. The average YI for the non-irradiated samples varied from 1 to 2.

About 100 mg of each sample was mixed with approximately 1 mg of spacers (20 um dia., Sekisui Chemicals, Japan), placed onto a transparent glass cap (30 mm×23 mm×0.7 mm OLED Encapsulation Glass; Senyo Trading Company, Hyogo, Japan), and covered with a glass slide (Thin Film Devices) to form an assembly. The assembly was then exposed to a UV LED (365 nm, Larsen Electronics, Kemp, Tex. USA) at an output of about 50 mW/cm$^2$ incident power for about 1 hour to simulate daylight exposure.

After UV irradiation, a small amount of the samples were then taken from the assembly and were then sandwiched between two glass slides (Thin Film Devices), and then re-measured with the spectrophotometer (Ultrascan Pro, Hunter Associates) to determine the YI after irradiation. The results are shown in Table 4. The results showed that CPAC-1 (used in CDD-4), PAC-6 (used in DD-10) and E7 (used in CDD-7 and CDD-8) were the most resilient to UV radiation. PAC-6 (used in DD-10) showed slightly less degradation than CPAC-1 (used in CDD-4), and PAC-6 behaved comparably to E7.

TABLE 4

Devices Irradiated With UV Radiation and Their Performance Data.

| Device | Example | Liquid Crystal/Mixture | After UV-Radiation Yellowness Index |
|---|---|---|---|
| DD-8 | Example 5.8 | F-1 | 37.9 |
| DD-9 | Example 5.9 | F-2 | 47.1 |
| DD-10 | Example 5.9 | F-3 | 1.8 |
| DD-11 | Example 5.9 | F-8 | 33.1 |
| DD-12 | Example 5.9 | F-10 | 48.7 |
| CDD-4 | Comp. Ex. 5.4 | CF-1 (F-6) | 4.5 |
| CDD-7 | Comp. Ex. 5.4 | Control-1 | 1.2 |
| CDD-8 | Comp. Ex. 5.4 | Comm. E7 | 1.1 |

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein.

Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

EMBODIMENTS

The following embodiments are specifically contemplated.

Embodiment 1. A liquid crystal composition comprising a first compound of Formula I:

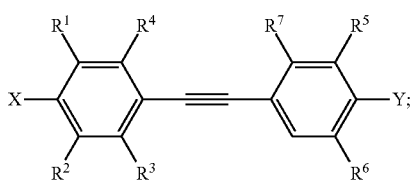

(I)

wherein X is optionally substituted $C_{2-12}$ alkyl, optionally substituted $C_{1-12}$ alkyloxy, optionally substituted $C_{2-12}$ alkenyl, or optionally substituted $C_{2-12}$ alkynyl;

Y is F, Cl, —CN, OH, $NO_2$, optionally substituted $C_{2-12}$ alkyl, optionally substituted $C_{1-12}$ alkoxy, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$;

$R^1$, $R^2$, $R^3$, $R^4$, $R^5$, $R^6$ and $R^7$ are independently H, F, Cl, —CN, OH, $NO_2$, $C_{1-6}$ alkyl, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$; and $R^a$ and $R^b$ are independently H or optionally substituted $C_{1-6}$ hydrocarbyl.

Embodiment 2. The liquid crystal composition of embodiment 1, wherein X is a $C_{2-8}$ alkyl or $C_{1-7}$ alkyloxy.

Embodiment 3. The liquid crystal composition of embodiment 2, wherein X is:

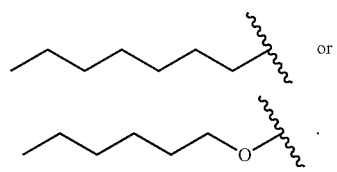

Embodiment 4. The liquid crystal composition of embodiment 1, 2, or 3, wherein Y is F, —CN, $C_{2-8}$ alkyl, or $C_{1-7}$ alkyloxy.

Embodiment 5. The liquid crystal composition of embodiment 4, wherein Y is F, —CN, or —$C_5H_{11}$.

Embodiment 6. The liquid crystal composition of embodiment 1, 2, 3, 4, or 5, wherein $R^1$ and $R^2$ are independently H or $C_{1-3}$ alkyl.

Embodiment 7. The liquid crystal composition of embodiment 6, wherein $R^1$ and $R^2$ are H.

Embodiment 8. The liquid crystal composition of embodiment 1, 2, 3, 4, 5, 6, or 7, wherein $R^3$ and $R^4$ are independently H or $C_{1-3}$ alkyl.

Embodiment 9. The liquid crystal composition of embodiment 8, wherein $R^3$ and $R^4$ are $CH_3$.

Embodiment 10. The liquid crystal composition of embodiment 1, 2, 3, 4, 5, 6, 7, 8, or 9, wherein $R^5$ is F.

Embodiment 11. The liquid crystal composition of embodiment 1, 2, 3, 4, 5, 6, 7, 8, 9, or 10, wherein $R^6$ and $R^7$ are independently H or F.

Embodiment 12. The liquid crystal composition of embodiment 1, wherein the first compound is:

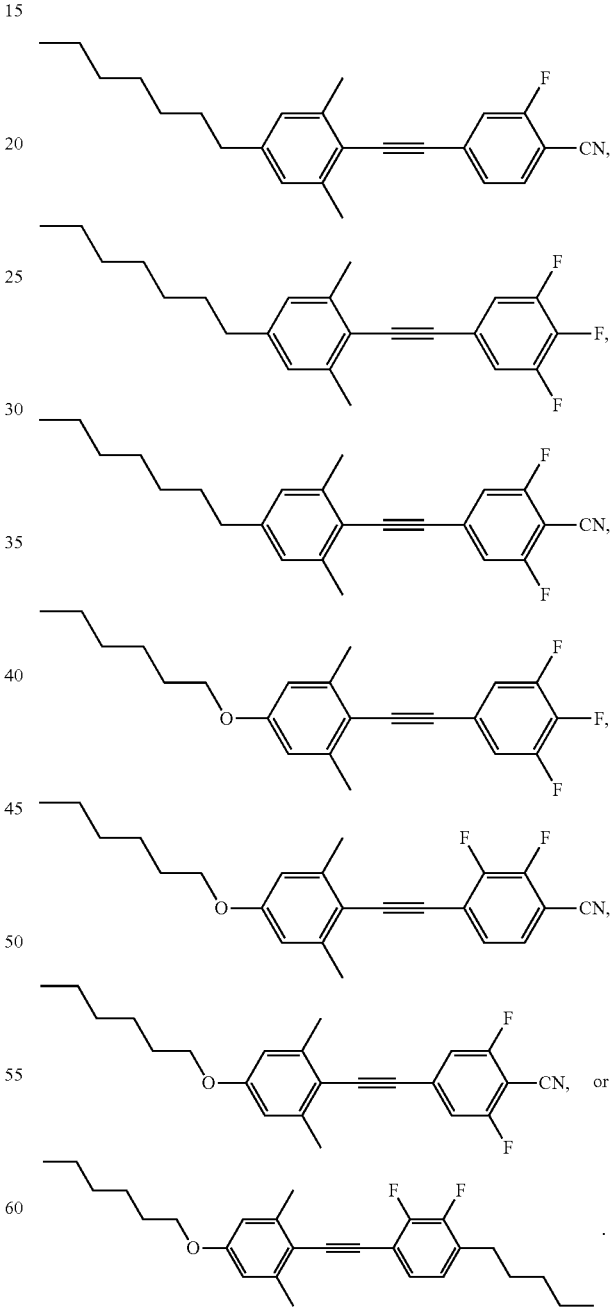

Embodiment 13. The liquid crystal mixture of embodiment 1, further comprising a second compound of Formula II:

(II)

wherein $X^1$ is substituted phenyl, substituted cyclohexane, substituted biphenyl, or substituted cyclohexylbenzene; and $Y^1$ is $C_{1-6}$ alkyl, $C_{1-6}$ alkyloxy, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$.

Embodiment 14. A liquid crystal mixture of embodiment 13, wherein $X^1$ is:

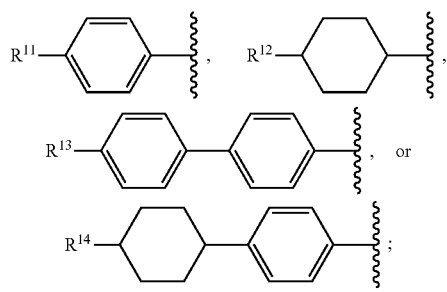

wherein $R^{11}$, $R^{12}$, $R^{13}$ and $R^{14}$ are independently alkyl or alkoxy.

Embodiment 15. A liquid crystal mixture of embodiment 14, wherein $R^{11}$, $R^{12}$, $R^{13}$ and $R^{14}$ are independently $C_{3-9}$ alkyl or $C_{3-9}$ alkoxy.

Embodiment 16. A liquid crystal mixture of embodiment 13, 14, or 15, wherein $Y^1$ is $C_{1-6}$ alkyl, $C_{1-6}$ alkyloxy, —CN, or —NCS.

Embodiment 17. A liquid crystal mixture of embodiment 16, wherein $Y^1$ is —CN or —NCS.

Embodiment 18. A liquid crystal mixture of embodiment 17, wherein $Y^1$ is —CN.

Embodiment 19. A liquid crystal mixture of embodiment 17, wherein $Y^1$ is —NCS.

Embodiment 20. A liquid crystal element: comprising
a transparency changing layer; and
at least two alignment layers each bounding to one side of the transparency changing layer;
wherein the transparency changing layer comprises a liquid crystal composition of claim 1.

Embodiment 21. The liquid crystal element of embodiment 20, wherein the transparency changing layer comprises one or more of the following compounds:

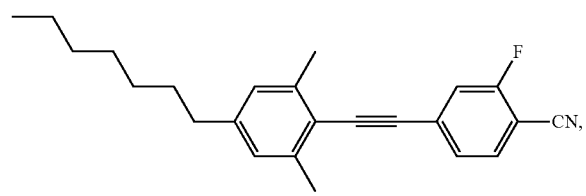

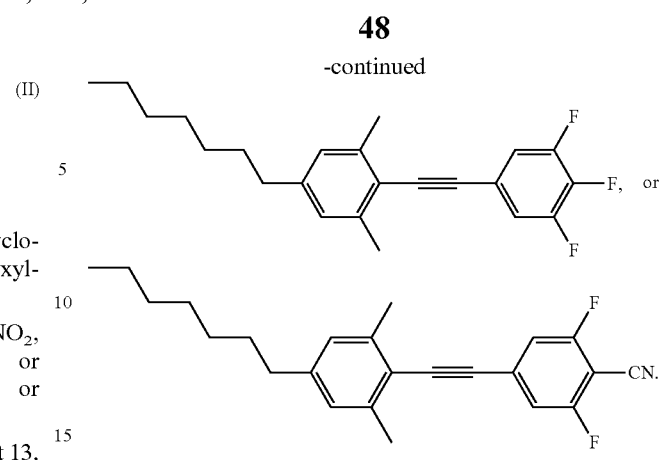

Embodiment 22. The liquid crystal element of embodiment 20, wherein the transparency changing layer comprises one or more of the following compounds:

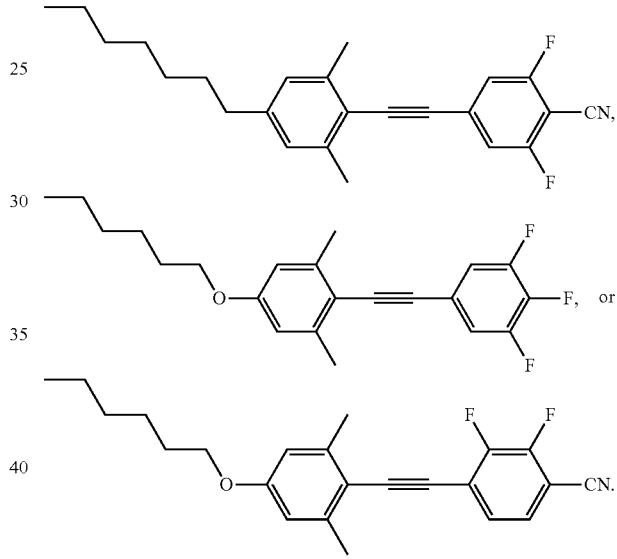

Embodiment 23. The liquid crystal element of embodiment 20, wherein the transparency changing layer comprises the following compound:

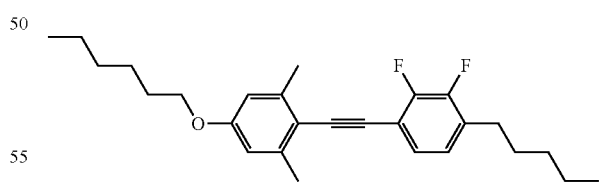

Embodiment 24. A liquid crystal element: comprising
a transparency changing layer; and
at least two alignment layers each bounding to one side of the transparency changing layer;
wherein the transparency changing layer comprises a liquid crystal composition of embodiment 13.

Embodiment 25. A liquid crystal mixture of embodiment 13 or 24, wherein the second compound is:

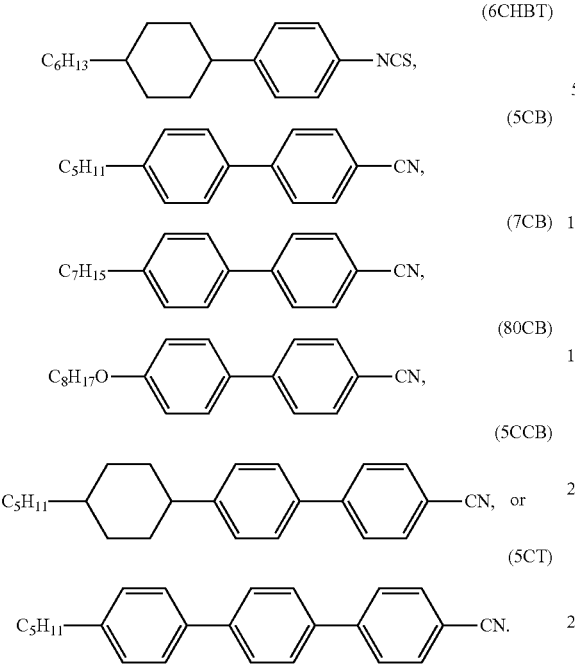

Embodiment 26. The liquid crystal mixture of embodiment 25, wherein the second compound is 6CHBT, and the second compound is 0 wt % to about 25 wt % relative to the total liquid crystal mixture.

Embodiment 27. The liquid crystal mixture of embodiment 25, wherein the second compound is 5CB, and the second compound is about 30 wt % to about 70 wt % relative to the total liquid crystal mixture.

Embodiment 28. The liquid crystal mixture of embodiment 25, wherein the second compound is 7CB, and the second compound is about 10 wt % to about 35 wt % relative to the total liquid crystal mixture.

Embodiment 29. The liquid crystal mixture of embodiment 25, wherein the second compound is 8OCB, and the second compound is about 4 wt % to about 20 wt % relative to the total liquid crystal mixture.

Embodiment 30. The liquid crystal mixture of embodiment 25, wherein the second compound is 5CCB, and the second compound is 0 wt % to about 16 wt % relative to the total liquid crystal mixture.

Embodiment 31. The liquid crystal mixture of embodiment 25, wherein the second compound is 5CT, and the second compound is about 4 wt % to about 12 wt % relative to the total liquid crystal mixture.

Embodiment 32. The liquid crystal mixture of embodiment 25, wherein the second compound is 5CB, and the second compound is present in an amount of about 48 wt % to about 62 wt %, and the liquid crystal mixture further comprises 7CB in an amount of about 18 wt % to about 31 wt %, 8OCB in an amount of about 5 wt % to about 12 wt %, and 5CT in an amount of about 7 wt % to about 11 wt %, provided that the total weight percentage of the liquid crystal mixture including the liquid crystal composition is 100 wt %.

Embodiment 33. The liquid crystal mixture of embodiment 25, wherein the second compound is 6CHBT, and the second compound is present in an amount of about 15 wt % to about 25 wt %, and the liquid crystal mixture further comprises 5CB in an amount of about 41 wt % to about 37 wt %, 7CB in an amount of about 13 wt % to about 17 wt %, 5CCB in an amount of about 10 wt % to about 16 wt %; and 5CT in an amount of about 5.5 wt % to about 7 wt %, provided that the total weight percentage of the liquid crystal mixture including the liquid crystal composition is 100 wt %.

Embodiment 34. A selectively dimmable device: comprising
a liquid crystal element of embodiment 20;
at least two conductive substrates; and
a voltage source;
wherein the first and second conductive substrates define a gap between them;
wherein the liquid crystal element disposed between the first and second conductive substrates within the gap;
wherein the substrates and the element are in electrical communication with the voltage source such that when a voltage is applied from the voltage source, an electric field is generated across the liquid crystal element.

Embodiment 35. The device of embodiment 34, wherein the device has a haze of at most about 25% when no voltage applied, and a haze of at least about 2% to visible light when a voltage of 15 volts or less is applied across the device.

Embodiment 36. The device of embodiment 34, wherein the device has a haze of about 40% to about 50% when a voltage of 20 volts or above is applied across the device.

Embodiment 37. The device of embodiment 34, wherein the device has a haze of about 10% or less, about 5% or less, or about 1% or less, when no voltage applied or when a voltage of 10 volts or less is applied across the device.

Embodiment 38. The device of embodiment 34, wherein the device has a haze of about 2% or less, about 10% or less, about 5% or less, or about 1% or less, when no voltage applied or when a voltage of 20 volts or less is applied across the device.

Embodiment 39. The device of embodiment 34, 35, 36, 37, or 38, wherein the substrates are flexible so that the device forms a flexible sheet.

What is claimed is:

1. A liquid crystal composition comprising a first compound, wherein the first compound comprises:

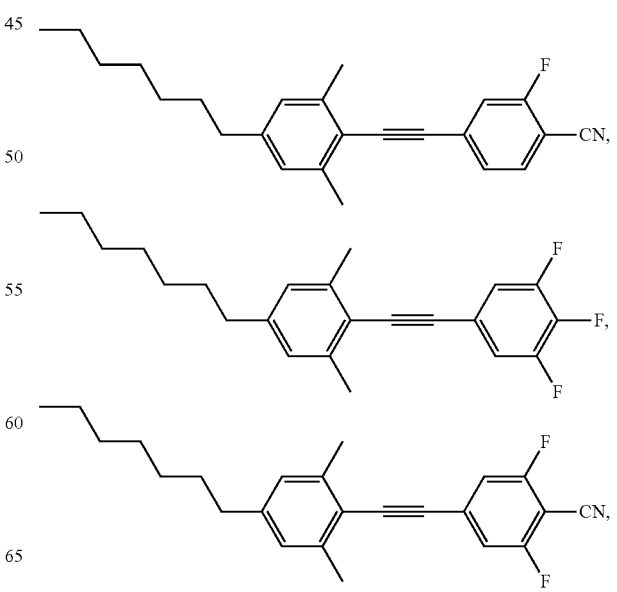

-continued

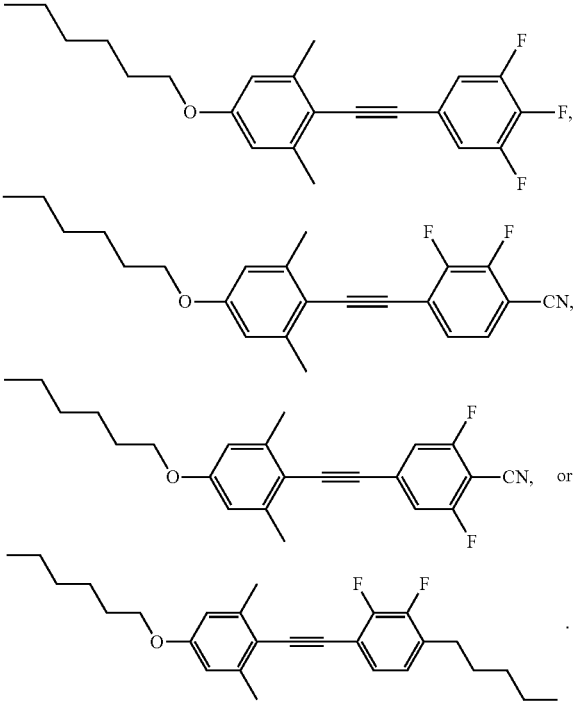

or a combination thereof.

2. The liquid crystal composition of claim 1, further comprising a second compound of Formula II:

(II)

wherein $X^1$ is substituted phenyl, substituted cyclohexane, substituted biphenyl, or substituted cyclohexyl-benzene; and
$Y^1$ is $C_{1-6}$ alkyl, $C_{1-6}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$.

3. The liquid crystal composition of claim 2, wherein the second compound is:

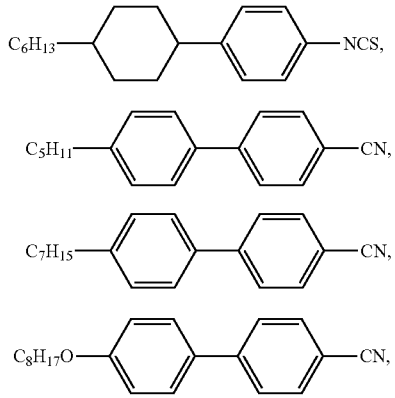
(6CHBT)
(5CB)
(7CB)
(8OCB)

-continued

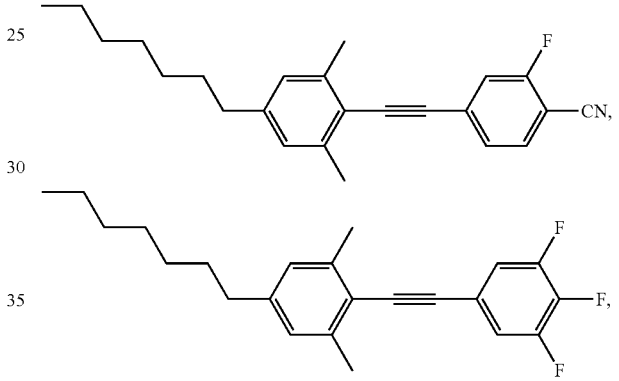
(5CCB)
(5CT)

or a combination thereof.

4. A liquid crystal element comprising:
a transparency changing layer; and
at least two alignment layers each bounding to one side of the transparency changing layer; wherein the transparency changing layer comprises a first liquid crystal compound comprising:

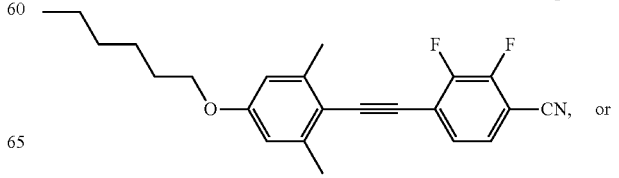

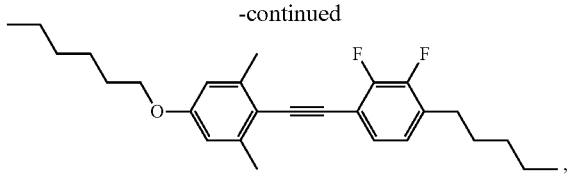

or a combination thereof.

5. The liquid crystal element of claim 4, wherein the transparency changing layer comprises a second liquid crystal compound, wherein the second liquid crystal compound is:

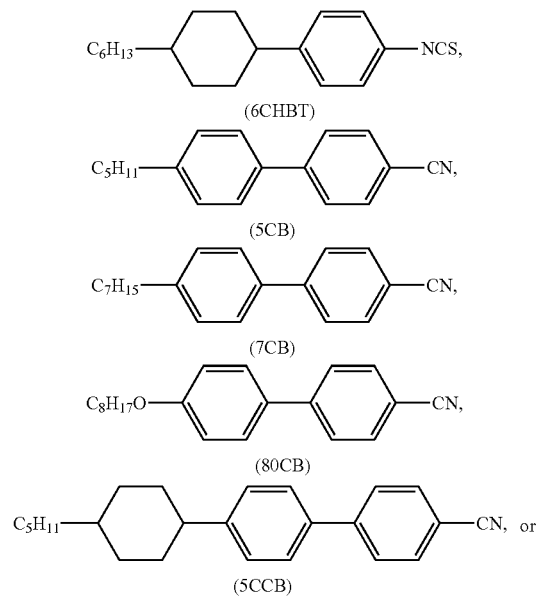

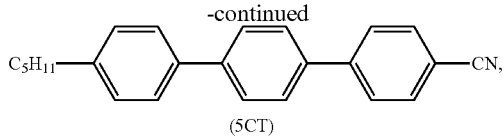

or a combination thereof.

6. The liquid crystal element of claim 5, wherein the second liquid crystal compound is 6CHBT, and the second liquid crystal compound is present in an amount of about 0 wt % to about 25 wt %, and the liquid crystal element further comprises 5CB in an amount of about 35 wt % to about 70 wt %, 7CB in an amount of about 13 wt % to about 31 wt %, 8OCB in an amount of about 0 wt % to about 20 wt %, 5CCB in an amount of about 0 wt % to about 16 wt %; and 5CT in an amount of about 5.5 wt % to about 10.5 wt %, provided that the total weight percentage of the liquid crystal compounds in the liquid crystal element including the liquid crystal composition is 100 wt %.

7. A selectively dimmable device comprising:
a liquid crystal element of claim 4;
at least two conductive substrates; and
a voltage source;
wherein the first and second conductive substrates define a gap between them;
wherein the liquid crystal element disposed between the first and second conductive substrates within the gap;
wherein the substrates and the element are in electrical communication with the voltage source such that when a voltage is applied from the voltage source, an electric field is generated across the liquid crystal element.

8. The device of claim 7, wherein the device has a haze of about 40% to about 50% when a voltage of 20 volts or above is applied across the device and wherein the device has a haze of about 5% or less when no voltage, or when a voltage of 10 volts or less, is applied.

9. The device of claim 7, wherein the substrates are flexible so that the device forms a flexible sheet.

\* \* \* \* \*

UNITED STATES PATENT AND TRADEMARK OFFICE
CERTIFICATE OF CORRECTION

| | | |
|---|---|---|
| PATENT NO. | : 11,186,773 B2 | Page 1 of 1 |
| APPLICATION NO. | : 16/093481 | |
| DATED | : November 30, 2021 | |
| INVENTOR(S) | : Khan et al. | |

It is certified that error appears in the above-identified patent and that said Letters Patent is hereby corrected as shown below:

In the Claims

Column 51, Line 25 - Claim 1: after last structure remove "." and replace with --,--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*